US008585501B2

(12) United States Patent
Shaw et al.

(10) Patent No.: US 8,585,501 B2
(45) Date of Patent: *Nov. 19, 2013

(54) ON-LINE GAMING SESSION AND PARTY MANAGEMENT

(75) Inventors: David Shaw, North Bend, WA (US); Patrick W. O'Kelley, II, Seattle, WA (US); Paul E. Newson, Duvall, WA (US); Johan Peter Hansen, Bellevue, WA (US); Vincent H. Curley, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1453 days.

This patent is subject to a terminal disclaimer.

(21) Appl. No.: 11/312,959

(22) Filed: Dec. 20, 2005

(65) Prior Publication Data

US 2006/0287099 A1 Dec. 21, 2006

Related U.S. Application Data

(63) Continuation-in-part of application No. 11/156,877, filed on Jun. 20, 2005, now Pat. No. 8,241,129.

(51) Int. Cl.
*A63F 9/24* (2006.01)

(52) U.S. Cl.
USPC .................................. 463/42; 463/9

(58) Field of Classification Search
USPC ............................................ 463/9, 42
See application file for complete search history.

(56) References Cited

U.S. PATENT DOCUMENTS

| 2,286,257 | A | | 6/1942 | Richards | |
|---|---|---|---|---|---|
| 6,106,399 | A | * | 8/2000 | Baker et al. | 463/42 |
| 7,056,217 | B1 | * | 6/2006 | Pelkey et al. | 463/43 |
| 2001/0044339 | A1 | * | 11/2001 | Cordero et al. | 463/42 |
| 2003/0050113 | A1 | * | 3/2003 | Leen et al. | 463/25 |
| 2003/0064807 | A1 | * | 4/2003 | Walker et al. | 463/42 |
| 2003/0093168 | A1 | * | 5/2003 | Nagaoka | 700/91 |
| 2003/0216184 | A1 | * | 11/2003 | Kigoshi | 463/42 |
| 2004/0097287 | A1 | | 5/2004 | Postrel | |
| 2004/0143852 | A1 | * | 7/2004 | Meyers | 725/133 |
| 2005/0181877 | A1 | * | 8/2005 | Kuwahara et al. | 463/42 |
| 2005/0200077 | A1 | * | 9/2005 | Brian | 273/242 |
| 2006/0121990 | A1 | * | 6/2006 | O'Kelley et al. | 463/42 |
| 2006/0247055 | A1 | * | 11/2006 | O'Kelley et al. | 463/42 |

FOREIGN PATENT DOCUMENTS

RU  2 102 790 C1  1/1998

OTHER PUBLICATIONS

Quake III Arena (users manual), 1999, Id Software.*

(Continued)

*Primary Examiner* — Werner Garner
(74) *Attorney, Agent, or Firm* — Alleman Hall McCoy Russell & Tuttle LLP

(57) ABSTRACT

A game hosting service manages game sessions and groups of players. The service creates, starts, and ends a game session. The service also manages the joining and deleting of players and groups of players both prior to and during game play. The service collects, stores, and optionally arbitrates statistics for each player such a game score and relative ranking with other players. The service assigns a group ID to a group of players to allow the group to migrate across game sessions. The game hosting service utilizes session management APIs to nest multiple sessions, thus enabling groups of players to remain intact across multiple sessions.

20 Claims, 14 Drawing Sheets

(56) References Cited

OTHER PUBLICATIONS

Screenshot of "Arena Servers" page from Quake III Arena, available at <http://imageshack.us/photo/my-images/133/q3servershf6.jpg/>.*

GibStats Quake Analysis Tool and Screenshots, downloaded on May 31, 2011, available at <http://www.quakewiki.net/archives/gibstats/screenshots.html>.*

Screenshot of "GibStats ||Welcome" screen showing release date of latest version (0.99) of GibStats III, downloaded on May 31, 2011, available at <http://www.quakewiki.net/archives/gibstats/index-2.html>.*

Custom Server Settings: OSP Tourney DM—Quake 3, Feb. 23, 2003, OrangeSmoothie.org, available at <http://static.hugi.is/games/quake3/osp/Docs/osp-q3-Variables.txt>.*

"Social Matching of Game Players On-Line", Specification, Application Number, Not Yet Assigned filed on Dec. 20, 2005.

"Determination of Reputation of an On-Line Game Player" Specification, Application Number Not Yet Assigned, filed on Dec. 20, 2005.

ISA U.S. Patent and Trademark Office, International Search Report of PCT/US06/17307, Jul. 30, 2007, 7 pages.

Office Action of Russian Patent Application No. 2007147424, Filed May 5, 2006, 8 pages.

* cited by examiner

ON-LINE GAMING SESSION AND PARTY MANAGEMENT

CROSS-REFERENCE TO RELATED APPLICATIONS

This application is a continuation-in-part of U.S. patent application Ser. No. 11/156,877, filed Jun. 20, 2005, titled "SETTING UP ON-LINE GAME SESSIONS OUT OF A GAME CONTEXT," the disclosure of which is hereby incorporated by reference in its entirety.

TECHNICAL FIELD

The technical field generally relates to gaming and multimedia devices, and more specifically relates to on-line game sessions.

BACKGROUND

In online gaming, game hosting services and game developers have created a number of ways to track and personalize the online gaming experience. One drawback of existing systems is that many of the features have grown up independent of each other. Games send blobs of data about gamers back and forth to a central service, but the service has no way to understand and aggregate the data outside of the game context. Games can host their own Websites, but the data displayed there is not universally accessible to other games.

In a sense, then, the service and games offer two parallel communities that offer great—but separated—resources for gamers. First, in the game community, while playing a game, the gamer can see the community of others who play the specific game, the leaderboards for that game, and his personal achievements in that game. A game can tell a gamer, from the Service data, if a Friend is online, but it can't tell the gamer what, exactly that Friend is doing on the Service or when he will be available.

Second, in the service community, the service knows a gamer player's history, all of the games he's played, the amount of time he spends online, the size of his Friends list and all of the games that Friends have played or are playing, the Friends invites sent and received, the Messages sent and received, and all of the Feedback the gamer has given and received.

Systems have tried to leverage these on-line communities to match various players to allow them to play multi-player games. Nevertheless, in general such systems, which typically emphasize skill or experience in a single game or small family of games, do not allow groups of players who are likely to enjoy shared interaction based on a variety of personal considerations to form a group outside of the game context and then collectively engage in a multiplayer game.

Further, because matchmaking interfaces have typically been part of each individual game's code, gamers have not had the ability to create a match with other players in one game and then roam with that group of players to another game.

SUMMARY

This Summary is provided to introduce a selection of concepts in a simplified form that are further described below in the Detailed Description Of The Illustrative Embodiments. This Summary is not intended to identify key features or essential features of the claimed subject matter, nor is it intended to be used to limit the scope of the claimed subject matter.

Systems and methods for playing multi-player computer-based games receive configuration settings from a plurality of different games. The configuration settings provides information regarding parameters of the game so that said service has the capability of matching a plurality of players according to the game's allowed parameters or let players create party sessions according to those parameters and then invite others to play in them.

A game hosting service is provided that has a database with information about a plurality of players and information about a plurality of different games that operate on a computing device. Coupled to the service is an input device for receiving from a player a selection of one of the plurality of different games and the player's particular choice among the configuration settings for said game. The service is functional apart from the game and allows the player to select any one of a number of different games from different game developers. Also coupled to the service is an output device for outputting a start message to a plurality of computing devices wherein said computing devices are selected as a function of the plurality of players and the one of the plurality of different games. The message contains information indicative of the configuration settings so that all of the computing devices can begin the game in the same way.

The game hosting service also includes party and session management APIs (application programming interfaces) for maintaining between the game hosting service and the game consoles a unique identifier that describes groupings of players. The game hosting service manages creation, starting, ending, and deletion of game sessions. The game hosting service manages statistics arbitration functions and also functions to determine if players can join in a game session. The game hosting service collects, stores and optionally arbitrates statistics for each player, including game score and relative standing with respect to other players in a game session. Also coupled to the service is an input device for accepting a game completed message from a game. This message contains information about the party of players returning to the console to choose to play a different game.

The information in the database about the plurality of players comprises information indicative of game playing skill and social attributes of said players. The systems and methods are capable of matching a subset of players as a function of the game playing skill and social attributes of said players.

BRIEF DESCRIPTION OF THE DRAWINGS

The foregoing summary, as well as the following detailed description of on-line gaming session and party management, is better understood when read in conjunction with the appended drawings. For the purpose of illustrating on-line gaming session and party management, there is shown in the drawings exemplary constructions thereof; however, on-line gaming session and party management is not limited to the specific methods and instrumentalities disclosed. In the drawings.

DETAILED DESCRIPTION OF ILLUSTRATIVE EMBODIMENTS

Figure 1:
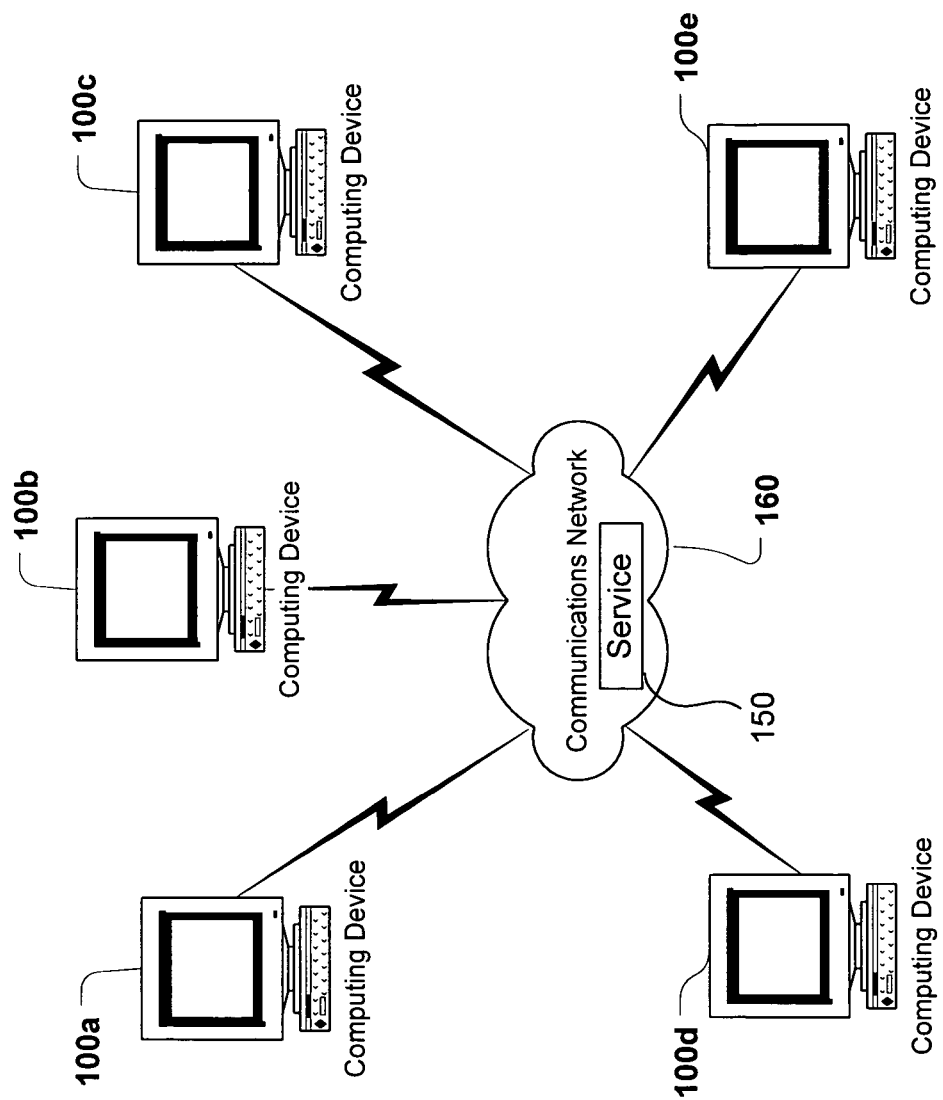
FIG. 1 is a block diagram of an exemplary computer network environment in which aspects of on-line gaming session and party management can be implemented.

FIG. 1 is diagram of an exemplary computer network that serves to illustrate aspects of on-line gaming session and party management. Here computers 100a-100e may host various ones of the computing objects such as games and other applications. Although the physical environment shows the connected devices as computers, such illustration is merely exemplary and may comprise various digital devices such as PDAs, game consoles, etc. Moreover, communications network 160 may itself comprise a number of computers, servers and network devices such as routers and the like.

There is a variety of systems, components, and network configurations that support distributed computing environments. For example, computing systems may be connected together by wireline or wireless systems, by local networks or widely distributed networks. Currently, many of the networks are coupled to the Internet which provides the infrastructure for widely distributed computing and encompasses many different networks. Aspects of the on-line gaming session and party management could be usable to distribute computer-readable instructions, code fragments, applications and the like to various distributed computing devices.

The network infrastructure enables a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computer that accesses shared network resources provided by another computer (i.e., a server). A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Clients and servers communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Uniform Resource Locator (URL) or an Internet Protocol (IP) address is used to identify the server or client computers to each other. Communication among computing devices is provided over a communications medium. In particular, the client and server may be coupled to one another via TCP/IP connections for high-capacity communication.

In general, the computer network may comprise both server devices and client devices deployed in a network environment (in a peer-to-peer environment devices may be both clients and servers). Communications network 160 may be a LAN, WAN, intranet or the Internet, or a combination of any of these that facilitates communication among a number of computing devices 10a-10e. Moreover, communication network 160 may comprise wireless, wireline, or combination wireless and wireline connections. Additionally, the computer network may comprise a distributed computing environment. In such an environment a computing task may be spread over a number of computing devices that are addressable elements in a computer network.

According to an aspect of on-line gaming session and party management, communication network 160 may host a service 150 that is accessible from the plurality of computers 100a-100e. The service 150 gathers information and tracks users of computers 100a-100e to provide computing services for all of the users of the service.

Figure 2:
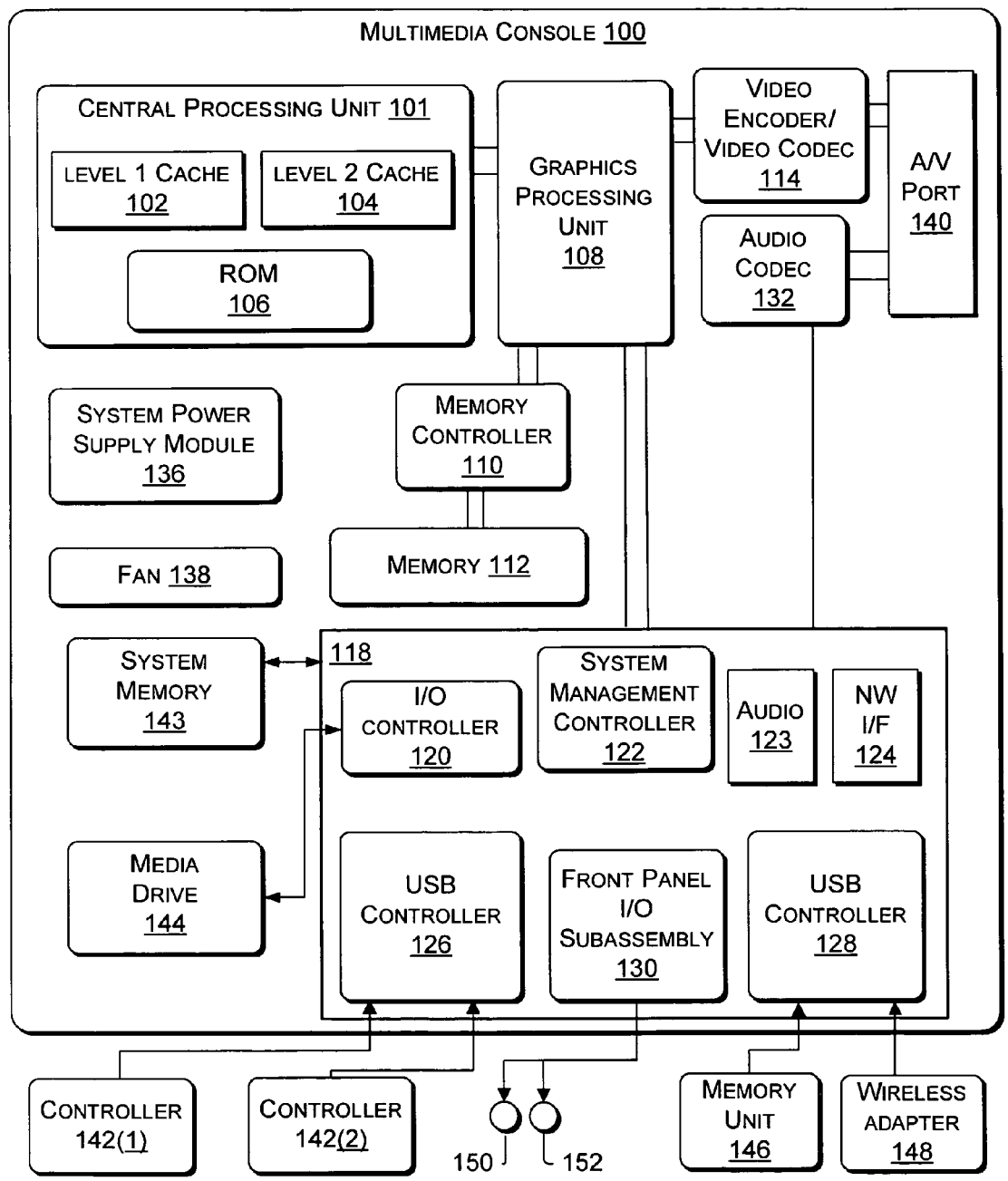
FIG. 2 is a block diagram illustrating an exemplary console that can be incorporated into a network computing environment such as the network computing environment of FIG. 1.

FIG. 2 illustrates the functional components of a multimedia/gaming console 100 that may be used as the computers 100a-100e in the network of FIG. 1. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in the larger network community as illustrated in FIG. 1.

According to an aspect of on-line gaming session and party management, when a game is executed on console 100, it provides information to a service operating on communications network 160. The service tracks the information for all of the users connected to the service to provide a rich user experience. The service tracks user information across games, consoles, computing devices, etc. By tracking the information for all users of the service, the service can aggregate statistics for all users and measure game playing ability, provide a richer user experience by providing information about friends (e.g., what game they are playing and what skill level they have attained), track user achievements and generally measure statistics for a game aggregated over a large user community.

In order to provide a consistent data set across games, the system contemplates a schematized, configuration driven process where each game generates a configuration file (according to the schema defined by the service) that defines the game data for a particular game. Through a game configuration process, games describe the data the game generates about each game player. By using the configuration process, the service will be able to understand the data as it flows from the game, and it will be able to integrate it in meaningful ways with the other data that the service understands to create a rich profile of each user of the service. The profile will follow the user wherever he goes on the service, i.e. it is game and location independent.

For each user (alternatively referred to as a player or gamer), the service will collect a number of pieces of data (called Profile Data) to build the User Profile in every game session—and even after a game session is concluded. In general, the pieces of the service experience that feed profile include:

1. What the user says about himself or herself (including account set up and the construction of an elaborate personal profile, including the preferred social gameplay "zone").
2. What others say about the user (feedback scores and a publicly visible reputation).
3. What the games say about the user (game configuration and integration of data that comes out of game play to compute a player's skill, among other things).
4. What the system says about the user (time online, aggregates of games played, Friends list, console behavior etc.)

The system creates a "User Profile," which serves as a building block for services and applications that aim to create a social community of gamers and grow relationships among players. The User Profile is the entirety of information (e.g., metadata) related to a specific user (i.e., the game player's digital identity). The User Profile is developed from a set of services that collect and expose this information in a meaningful way to the community. The User Profile also provides for personalization such that users can customize and enhance their gaming experience. As will be discussed in greater detail below, the User Profile consists of various components, including, but not limited to, a Gamercard, game achievements, and gamer preferences.

Figure 3:
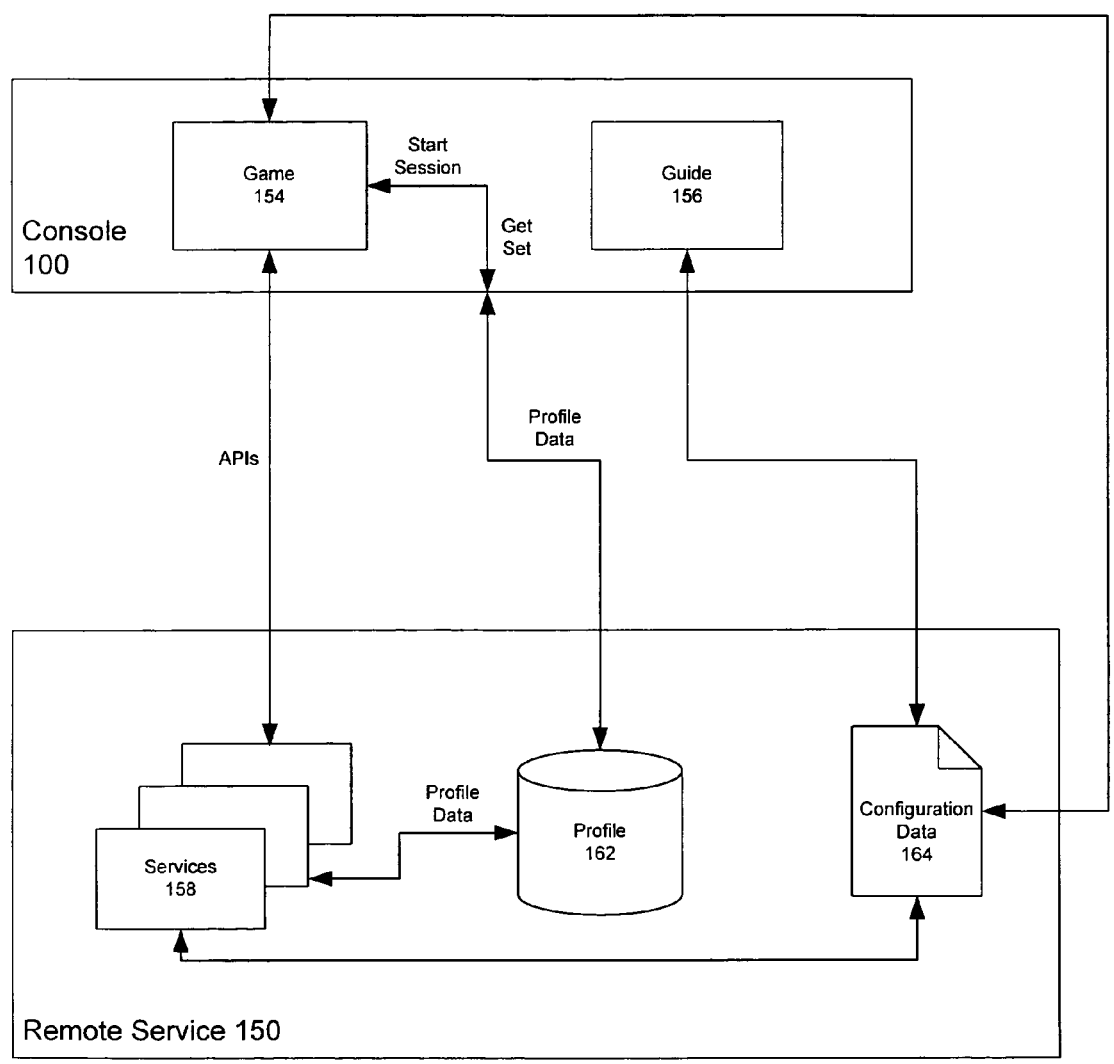
FIG. 3 is a block diagram illustrating the interaction of a console with the remote service.

Referring to FIG. 3, there is illustrated an overview of an exemplary architecture that may be used to implement the User Profile interaction as well as user interaction with the game session service described more fully herein. The console 100 interacts with a remote service 150 that provides services 158 such as voice/chat, a friends list, matchmaking, content download, roaming, feedback, tournaments, voice messaging, and updates to gamers. The service 150 also maintains the User Profiles in a profile database 162 and configuration data 164 used by the services 158 and games 154. The service 150 collects User Profiles, aggregates, processes information supplied by other services 158, and fulfills real-time client requests for retrieving User Profile-related services. The User Profiles in the database 162 are also used by the games 154 to enable, among other things, personalization and customization, etc.

Using the console 100, the user may interact with a Guide 156. The Guide 156 provides an interface where the user may navigate to, and enter, various online areas and options provided by the service 158. The configuration data 164 stored by the service 150 may be used to determine features and options provided by the Guide 156. When the game 154 is running, a defined set of APIs (including SetContext, SetProperty, SetAchievement, and Session APIs for writing data about players, and a number of specialized read APIs for viewing stats, achievements, and other User Profile data) are used to call and interact with the services 158. When requesting User Profile information via the APIs, the game 154 may pass a unique identifier of a user. The service 150 may return a Gamercard (discussed below), game stats, game achievements, affiliations, game settings, etc. Additional details of the various aspects of the exemplary architecture are provided below.

Service 158 assists in tracking and displaying a wide-variety of in-game stats, such as number of points, best lap times, and (importantly, for calculating the skill value needed in Matchmaking) win/loss. All stats are provided by the various games that a user plays and provided to the service for inclusion in a player's User Profile. For example, a first-person shooter title may want to define a 'Points' Property to be tracked independently for each 'Map' Context (e.g. 5 Points on Blood Creek vs. 10 Points on Battle Range). That information could be displayed as:

| "PER-MAP POINTS" Map | Points |
|---|---|
| Blood Creek | 5 |
| Battle Range | 10 |

Each game can support a minimal set of information that matches the character of the game and that can be tracked for each user of the service 158.

Figure 4:
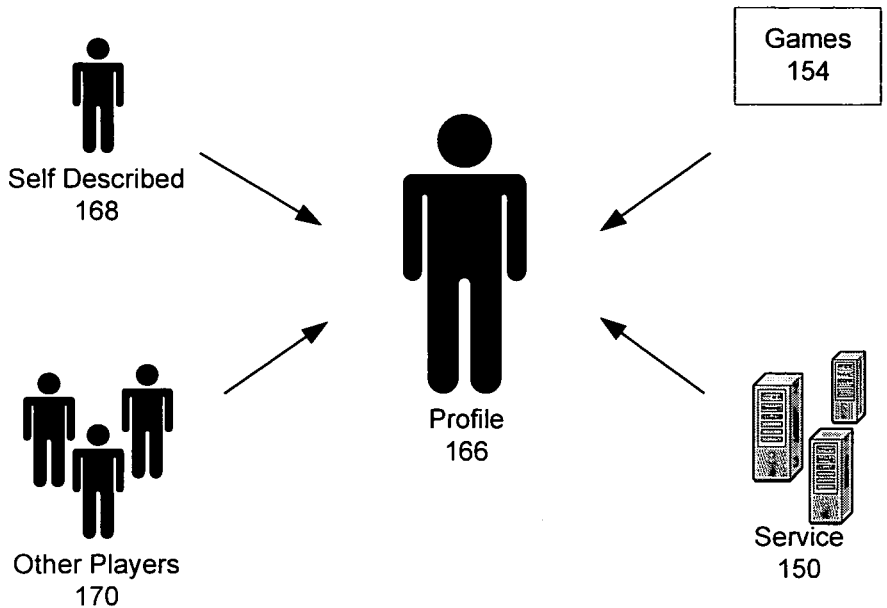
FIG. 4 illustrates the information gathered to build a User Profile.

FIG. 4 illustrates the information gathered to build a User Profile. The owner of User Profile 166 can edit his/her User Profile 166 directly and control who can view each section of the User Profile. The User Profile 166 may be edited via general fields (e.g., tile, country, language, gender, greeting, etc.) and/or system settings (e.g., voice output, controller vibration, character name, game format, game mode, etc.). Privacy/Opt-out Settings can be tuned for the User Profile 166 to, e.g., restrict presence information only to friends, allow game achievements to be visible to all, etc.

The User Profile is associated with a list of other players known as "Friends." Friends are other gamers who the player has invited (and who have accepted the invitation) to be on a Friends List.

The User Profile is also associated with a list of players known as "Recent Players." The Recent Players are a list of the most recent N players that the User Profile owner has played with across all games.

The User Profile 166 may include feedback provided by other players 170. Feedback helps others learn about a particular gamer. For example, if the gamer uses foul language or aggressive play in game sessions, other gamers may submit feedback to the service 150. The feedback mechanism improves the user experience by building reputations. Players are therefore anonymous, but not unknown because of the accumulated feedback.

In another aspect of the system, the service 150 and games 154 track online and offline activity of users to provide usage statistics in the Gamer Profile 166. When a gamer plays online, a particular game title is added to list of games played that is made visible to others. While offline, the game console 100 and game 154 track the user's activity via a mechanism for instrumenting games to collect detailed information about a specific player's in-game statistics and accomplishments. The Gamer Profile 166 is updated during the next connection to the service 150 to reflect the offline play. Game achievements may be reported to the service 154 by games via the User Profile data mechanism.

Referring to FIGS. 5-8, the Gamer Profile can be viewed in a number of ways and forms, and is typically displayed in the Gamercard 172. The Gamercard 172 is the visual representation of the Gamer Profile 166 that is available to games on the console 100 and, e.g., the web. The Gamercard 172 serves as a summary or snapshot of a player's Gamer Profile 166. Gamers may use the Gamercard to set up a matchmaking list where gamers are added to a preferred player's list to play again in the future.

Figure 5:
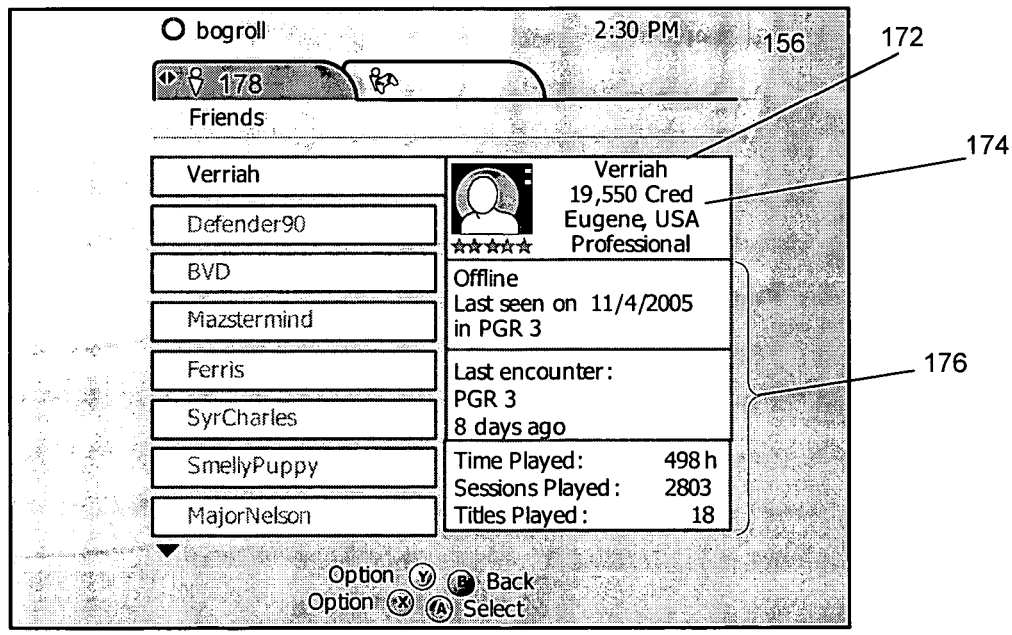
FIG. 5 is example illustration of a user interface displaying User Profile information.

As shown in FIG. 5, the Gamercard 172 may be divided into two regions, a base area 174 and a context-specific (or extended) area 176. The base area 174 provides a set of Gamer Profile information in a standard and consistent way across multiple contexts, whereas the extended area 176 may be customized to fit a specific context. Although the Gamercard 172 of FIGS. 5-8 are shown in the context of the Guide 156, the Gamercard 172 may be visually separated from the rest of the screen and adopt the background color of the screen it is displayed on.

The base area 174 may be provided in different variants corresponding to differing contexts, while being a consistent view within each context. For example, an online Gamercard 172 is shown when one player is looking at another player's Gamercard 172 during an online session. The online base area 174 includes details such as the player's Gamertag, gamer tile, overall community rating, gamer Cred (a points-based reward points system), gamer zone, country, membership tier, awards, etc. An offline Gamercard 172 is shown when a player is looking at his/her own Gamercard 172. The offline base area 174 may include a subset of the online base area and may further include information regarding titles played and time played. The base area 174 of a Gamercard 172 is preferably fixed in size, has a consistent, static layout and has a fixed placement of all information elements, such as Tile or Gamer Cred.

Figure 6:
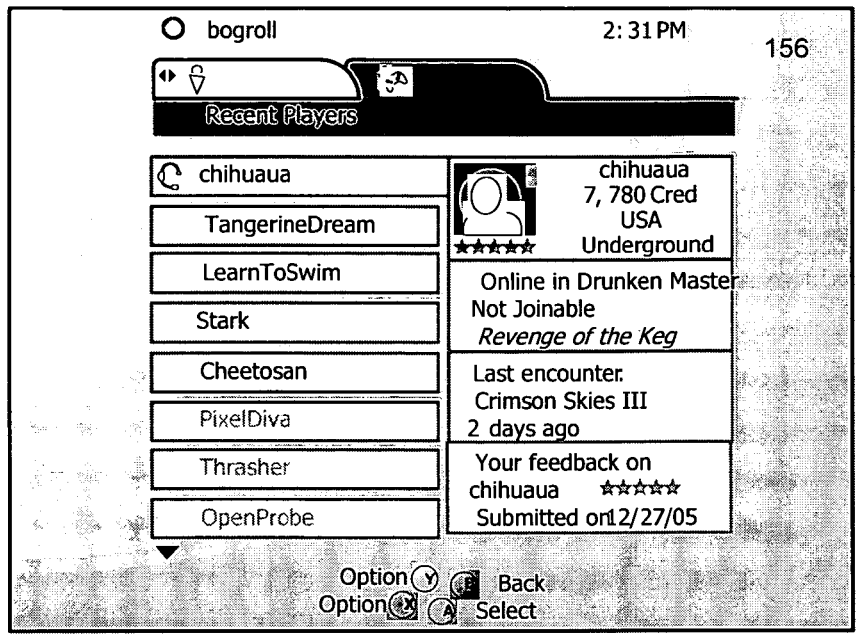
FIG. 6 is another example illustration of a user interface displaying User Profile information.
Figure 7:
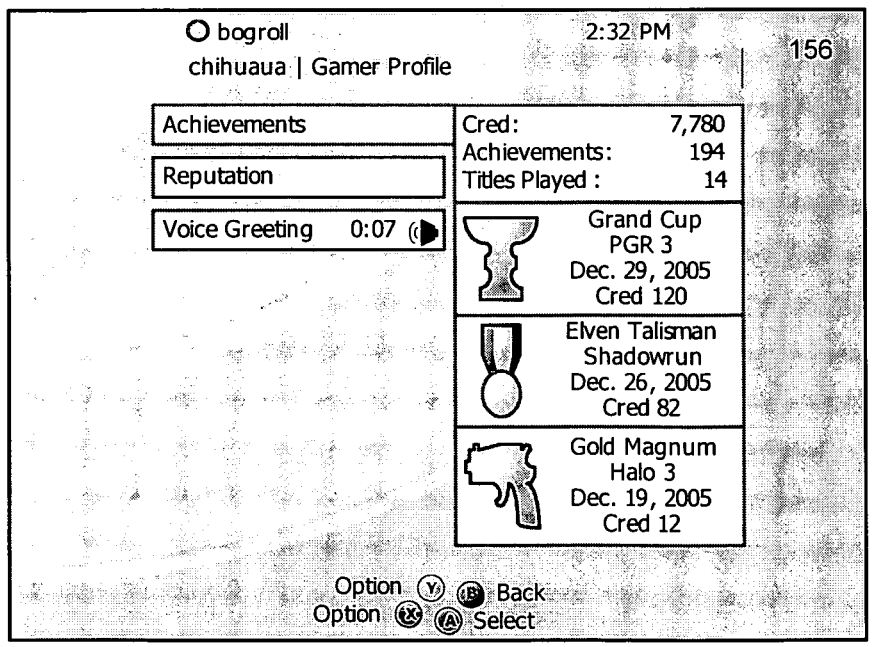
FIG. 7 is anther example illustration of a user interface displaying User Profile information.

The extended area 176 may include a set of Gamercard Actions, such as "View Profile," "Send Friend Invite," and "Send Feedback," etc. The extended area of the Gamercards is preferably not fixed in size, because it may vary based on the context. As shown in FIGS. 5-7 a user may scroll through the list of other users via the Guide 156 and a friends list 178. The Gamercard for other users may be displayed as the user scrolls among his/her friends or the user may be presented with an option to see a full view of the Gamer Profile. The full view mode consists of different views of the extended area 176 and may include several sections, such as a Profile Summary, Community Feedback, Game Achievements, Activity, and Social Network. The Guide 156 may advance through the list of friends, Recent Players (and summary sections for each player), a user home page for navigating to various options and settings, etc.

The profile summary includes information regarding number of games played, time played, tile, greeting, etc. The community feedback includes ratings on style, sportsmanship, language, cooperation, etc. The game achievements section includes recent titles, experience points (gamer Cred), time played, game-specific stats and achievements, etc. The activity section includes Gamer Cred earned, sessions played, total time played, active days on the service, etc. The social network includes friends, groups, positive/negative feedback count, etc.

Matchmaking:

For online, multi-player games, Matchmaking connects a game player to a session. A Match made session is an instance of game play that includes two (2) or more players or gamers playing a game until they either decide to terminate the session or until the session meets its end criteria (as defined by the game). The person who creates the session is the host. Some games are hostless, meaning that the game does not assign any special function to the person who originated the game. In such a case, the originator may, in fact, be a person who was searching for a session with specific criteria and, when it was not found, the game created a session for the person and advertised it for others to match into it. Matchmaking involves joining a session that has, as a minimum, one player already in place. A session is said to be joinable if there are open slots available to the person seeking a slot and the game play has not yet begun (the game is in "lobby" state). Some games that have join in progress sessions will advertise that a session is joinable until every public slot is filled. A gamer makes a Match by selecting "Matchmaking" in a game or in an out-of-game Matchmaking system. The Matchmaking UI may allow a gamer to add some filters to his search for a session (e.g. like specifying a map or difficulty level), or it may push a gamer directly into a search query. In most cases, with or without filters, a gamer is given a session search result which consists of a list of sessions. Each session is defined by a session descriptor that includes a short summary the most salient information about that session. A gamer then selects a session and joins it. Typically, a player then enters a lobby and awaits other players to match into the game before game play begins. In some cases, no search result is shown, and players are dropped instead directly into the lobby of the game that best meets their search criteria.

One kind of matchmaking, "Social Matchmaking," included in this system leverages User Profile data and the "Affiliates List" to improve the social dynamics of match sessions. When a game player chooses to matchmake into a session in the system described here as "Social Match," in the first session, the profile data he has set describing himself is used to "prime the pump" and find the best fellow new gamers to play with. Just by playing, the game player associates with a group of fellow gamers who become Recent Players on an "Affiliates List" (described below). The service preferably prioritizes playing with Recent Players over strangers in future session, but once a game player gives positive feedback, these "positive feedback" people are remembered by the system and are given even higher priority. Over time, as a gamer becomes very familiar with a set of players, he invites them to become friends. These friend gamers are given the highest priority.

This Social Matchmaking system will connect people who have similar intent and who share a similar profile to insure that they all have a good time, in and out of game play (but primarily in game play). Matchmaking—with its use feedback and profile data—facilitates people expanding and refreshing their online community with increasingly refined matches over time. Ultimately, Matchmaking will bind people to the service as a safe, secure place to meet new people and create a history of positive experiences.

Several of the aspects of User Profile that surface in a Gamercard can be used to match a game player to a session. At a high level, according to an aspect of on-line gaming session and party management, when a game player signs up in the service 150, he is asked to select a Gamer Zone that best describes the kind of social environment he prefers to play in. Before the service has other profile data to use, this Gamer Zone is used to match the game player with other players who have selected the same Zone. This match is done by a simple database query looking for Social sessions that contain a majority of players with this same Zone.

As time goes on and the service has additional data about each player, this Match query can be improved by averaging multiple key aspects of User Profile (still the Zone, but as time goes on, also feedback reputation, skill computed via stats, and his experience defined by Achievements achieved) for each participant in a session. The system then can provide a session "profile" that can be compared with the User Profile of a player seeking a match. The match system can then query this session profile by comparing it to the values in a User Profile of an individual who wishes to join the session. If the match of the User Profile is sufficiently close to the session profile values (sharing the same Zone and within a pre-specified range for each of the numeric values for reputation, skill, and experience), then the user will be shown that session as a Match. If the match comparison is not within the pre-specified ranges, then the user's query will continue on to compare to other sessions' session profiles until a positive result is achieved. In exemplary embodiments, NAT type, physical proximity to other players, time played on the system, games played, etc., or a combination thereof for example, are folded in on the back end when a Match search is performed.

In addition to Matchmaking based on a query with User Profile, the Social Matchmaking system, in conjunction with the tracking of friends, Recent Players, and feedback on Recent Players, builds a network of Affiliates who are prioritized for Match.

The Affiliates list is a prioritized list of people for a player that includes (1) Friends (i.e. people who the player has invited, and who have accepted the invitation, to a preferred social network that allows exchange of messages and state information), (2) Positive Feedback people (i.e. people about whom the player has given positive feedback), and (3) Recent Players. The Social Matchmaking service always looks first (before conducting the query above) for the presence of Affiliate sessions on the service. If any person on a player's Affiliates list is online and in a joinable session, the service will return that session. If there are multiple Affiliate sessions, the ones with Friends are given priority over those with Positive Feedback People or those with Recent Players. Positive Feedback People are given priority over Recent Players.

In accordance with the above, FIG. 6 illustrates a list of Recent Players in the Guide 156. A person is added to a player's Recent Players list when the player has played an online game session with the person. The Gamercard displayed when browsing Recent Players shows the base area and an extended area that provides information regarding recent games, feedback, and presence of the Recent Players. FIG. 7 illustrate further details that may be obtained about Recent Players, such as general achievements.

Figure 8:
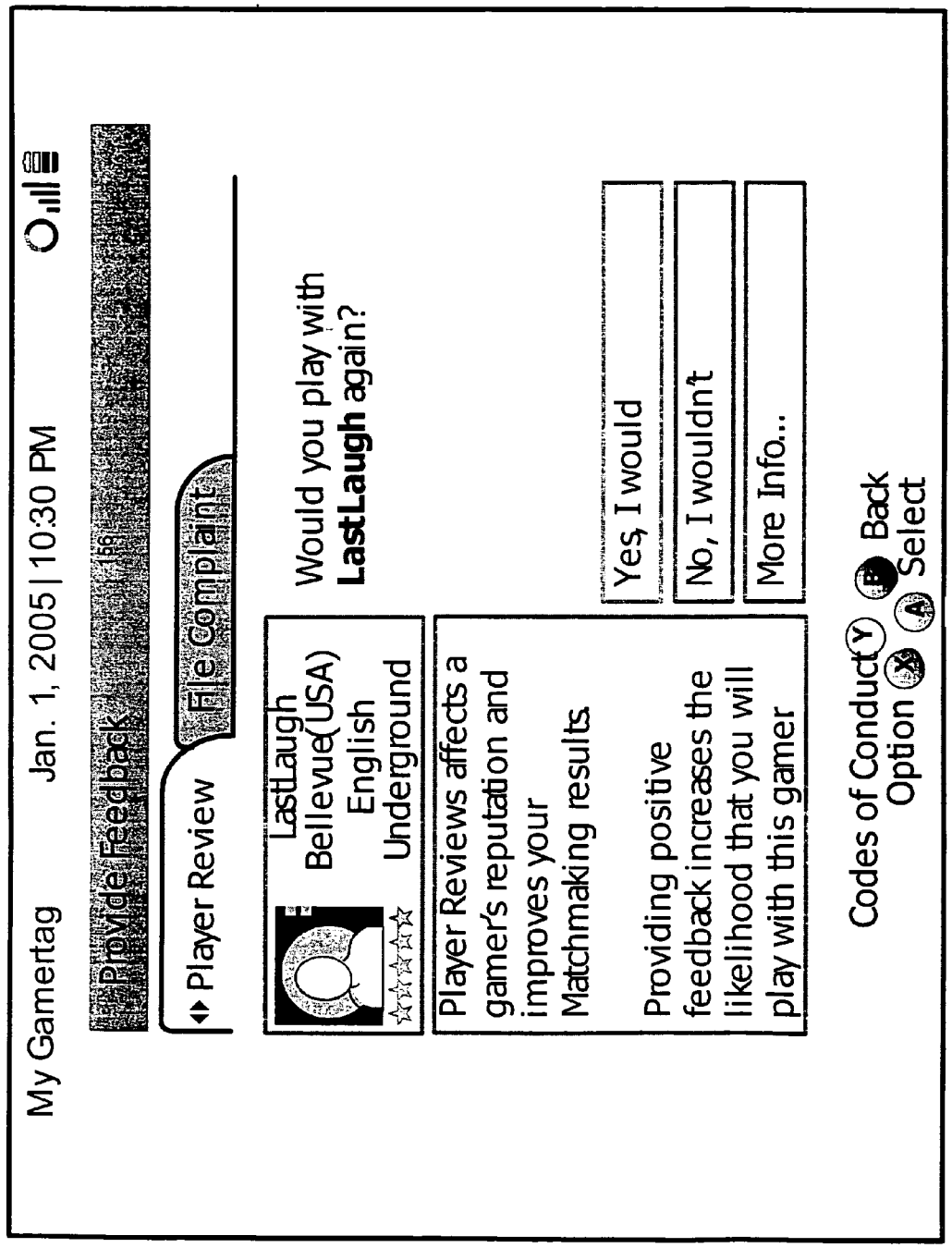
FIG. 8 illustrates a feedback mechanism whereby a game player can provide feedback on other game players.

Importantly, FIG. 8 illustrates a feedback mechanism whereby a game player can provide feedback on other game players. This feedback options is only available on a Gamercard when the viewing player has played with the person before. This feedback information is then used to improve matchmaking results, i.e., indicates whether or not you would want to play with this game player in future games. By giving positive feedback on a person, that person moves up in priority in that player's Affiliates list. Moreover, the feedback affects the game player's reputation and may change the group of players with whom the player is grouped in future games.

Feedback is, then, for the purposes of Matchmaking, the creation of a "one-way" friends list, i.e., a low threshold mechanism to build a list of people you meet again and again. This mechanism is generally invisible except as an improved matchmaking experience. For example, when a game player indicates that he would like to play with a particular person again, the system tracks that information in a one-way friend list so that the other player doesn't have to be invited or accept an invitation to be on a friends list.

If a player gives negative feedback on a person, that person moves to an "Avoid" list, and for the purposes of Social Matchmaking, future sessions containing that person will be avoided for the player.

In additional to social matchmaking as described above (using User Profile data and matching with Affiliates), the system also offers a "Ranked Match" option that matches players only based on their skill in a particular game. This skill, collected as a game statistic, is also stored in the User Profile. Skill-based match is preferred by competitive players.

Out-of-game Matchmaking is a multi-part system for creating sessions (as defined above) that includes setting up a game in the match configuration tool, generating a user interface out-of-game (i e. in the console system app UI) that allows gamers to search for a session according to game parameters and the social attributes (User Profile, Affiliates list) known by the service. It also includes a console system app UI (part of the Guide) that allows players to browse Gamercards and invite their Affiliates (friends, Recent Players, and positive feedback people) to assemble a Party of players. The system then offers a "StartSession" message that passes from the console system to the game a schematized list of game settings and unique player IDs associated with each session participant. It also includes a set of APIs that allow the console and the game to manage the groupings of players assembled in the console application by associating each grouping with a unique ID that can be passed back and forth from console to game. And finally, it includes "GameCompleted" message that allows the game to pass the list of players back to the console application when the players finish the game but wish to stay together as a party and roam to another game.

The Match Configuration Tool allows game developers to input the game's matchmaking session description according to a schema. With the tool, the game tells the service the steps that a gamer will need to go through to create a multi-player on-line game session. This definition makes sure that the service understands all of the key game permutations (from map names to vehicle types) so that the service can capture the starting point of a game session. The match configuration tool includes a node that allows games to create one set of Ranked customized settings and one set of Social customized settings. The two edit screens should be identical, except for the "Ranked" v. "Social" label at the top of each screen. These edit screens will be used to created out-of-game match UI that allows gamers to create customized match queries (ala Optimatch) in the Guide.

Each edit screen allows a game developer to insert a simple list of contexts and/or properties from those he has already created or that are predefined in the tool ("number of player," for example, is pre-defined since it is required for all games). Contexts are enumerated lists of strings whereas properties are numeric values (integers or floating point values). An example of a context is "Map" and its enumerations would include all the possible maps available in the game. The game developer can also create and insert new contexts and properties.

For each context and property added, the game developer must also provide a localized string label that provides the text that will appear next to the multi-select options in the out-of-game match UI. The default localized string label should be the string label for the context or property itself.

The default value for context values in the UI will be based on the default chosen when the context values were created. For properties, however, the developer must specify the range of values, the step size (for numeric properties), and the default.

For contexts in which the number of players is relevant, the game indicates the minimum and maximum number of players allowed for each context value setting. For example, for a "map" context, the game can specify that a minimum of 2 players and a maximum of 16 players can play on the "Waterloo" context value.

"StartSession" Message:

The system also provides the format of a StartGame message that the game will need to accept when a gamer has created a session in the out-of-game application according to the schema defined in the configuration tool. This message includes the session choices (map, difficulty level etc.) that the gamer chose based on the options the game developers indicated in the configuration process. With this message, the game can then inject the gamer into a lobby to await others to join the session via matchmaking.

The StartGame message contains the following information:
 Personally Unique Identifiers (PUIDs) for all gamers in the session
 Host PUID (for Standard games)
 Ranked/Standard Flag
 Unique Party ID
 Game settings (set in "Customize" screen in the system app UI by session host or acting host)—sent as context/property list.
 Game Title ID When a game receives a StartGame message, it accepts all of the players into a pre-game lobby. In that lobby, for Ranked games, the game begins a countdown and then injects the players into game play. No gamer has the option to adjust the game settings. For a Social game, the host can choose to adjust game settings if needed, and some detailed game settings (e.g. choose car color etc.) can be available to all gamers. The host can then start the game, or the game can start the game as it normally would when a sufficient party is created.

GameCompleted Message.

When a game is completed and the host chooses to return his party to the out-of-game lobby from the post-game lobby, the game sends the system a GameCompleted message.

The GameCompleted message contains the following information:
 PUIDs for all gamers in the session (the same as the list from the StartGame message, minus any members who dropped out of the party or disconnected their consoles)
 Host PUID (for Standard games; the host may have changed if the game allows for host migration and the original host dropped out of the game)
 Party ID
 Game Title ID
 Last game settings (these are sent back so that the console app can cache them for the host so that they are pre-set next time the host selects the game in the system app UI)
 Session and Party Management.

Session APIs between a game hosting service and various game systems provide a single entity for managing pre-game functions before a session is started, for managing in-game functions while a session is ongoing, and for managing post-game functions after a session is ended. Session APIs also manage arbitration functions and manage parties, or groups, of players. To better understand session APIs, an exemplary scenario is described illustrating interactions between a session and game systems.

Figure 9:
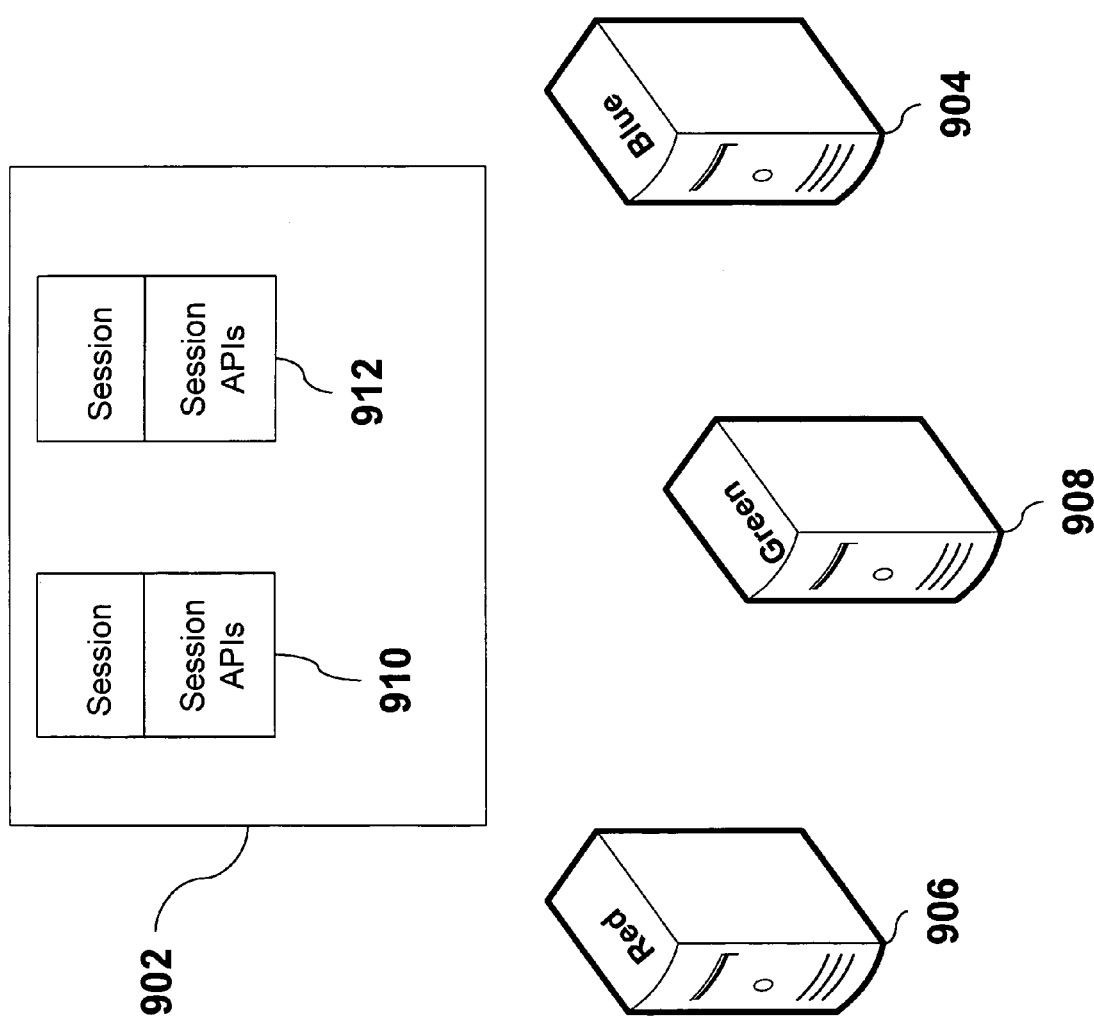
FIG. 9 through FIG. 12 depict an exemplary scenario of a game hosting service managing a computer-based game session.

FIG. 9 is an illustration of three game systems and a game hosting service about to interact. FIG. 9 shows Blue system 904, Red system 906, Green system 908, and the game hosting service 902 comprising two sessions: session 910 and session 912. Each session has associated session APIs. Each game system can comprise a multimedia console, such as multimedia console 100 of FIG. 2, for example. The game hosting service 902 is advertising the two sessions 910, 912. In this exemplary scenario, player Red is just beginning the matchmaking UI, and player Blue is finishing the same matchmaking UI. Player Green's game is running, but player Green is not yet active.

Figure 10:
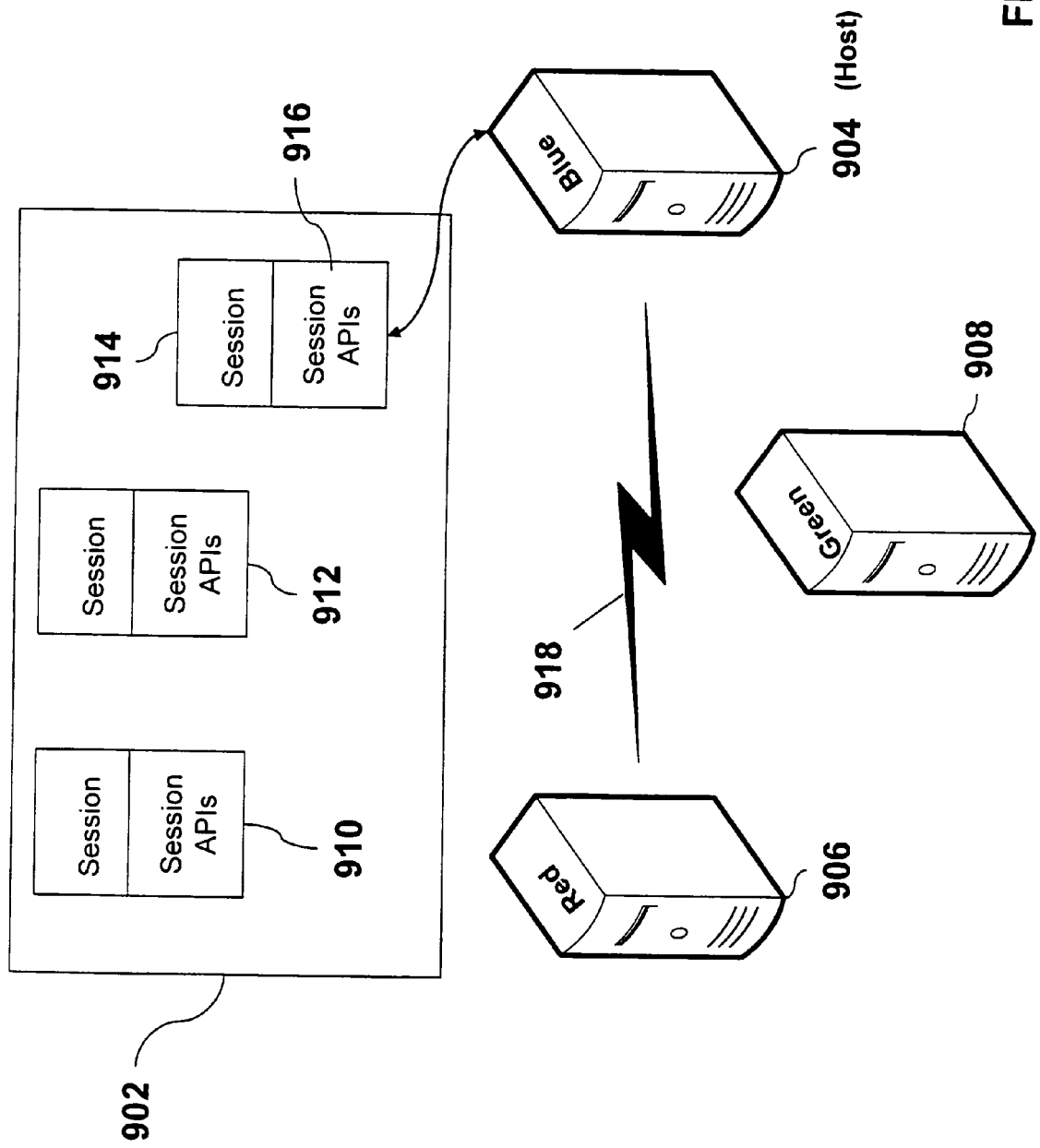

Player Blue is searching for a specific type of session and can not find a session with the correct parameters via the game hosting service 902. As depicted in FIG. 10, Player Blue thus decides to host a session via the Blue game system 904. The session APIs 916 creates session 914 and the session 914 is advertised in Matchmaking. Player Blue waits for more players to join the session 914. Player Red is selecting options in the matchmaking UI. And Player Green is still inactive.

As the exemplary scenario continues, Player Red searches for sessions in matchmaking and finds three sessions; session 910, session 912, and session 914. In accordance with various social and skill information pertaining to player Red and parameters associated with the session 914, player Red's game system 906 and the game hosting service 902 determine that session 914 is the best session for player Red to join. Player Red's game system 906 interfaces with the session APIs 916 to create a local copy of the session 914 in player Red's game system 906. Player Red's game system 906 also interacts with the session APIs 916 to add player Red to the session 914. Communication, such as via a network for example, is established between player Red's game system 906 and player Blue's game system 904 as depicted by link 918.

Figure 11:
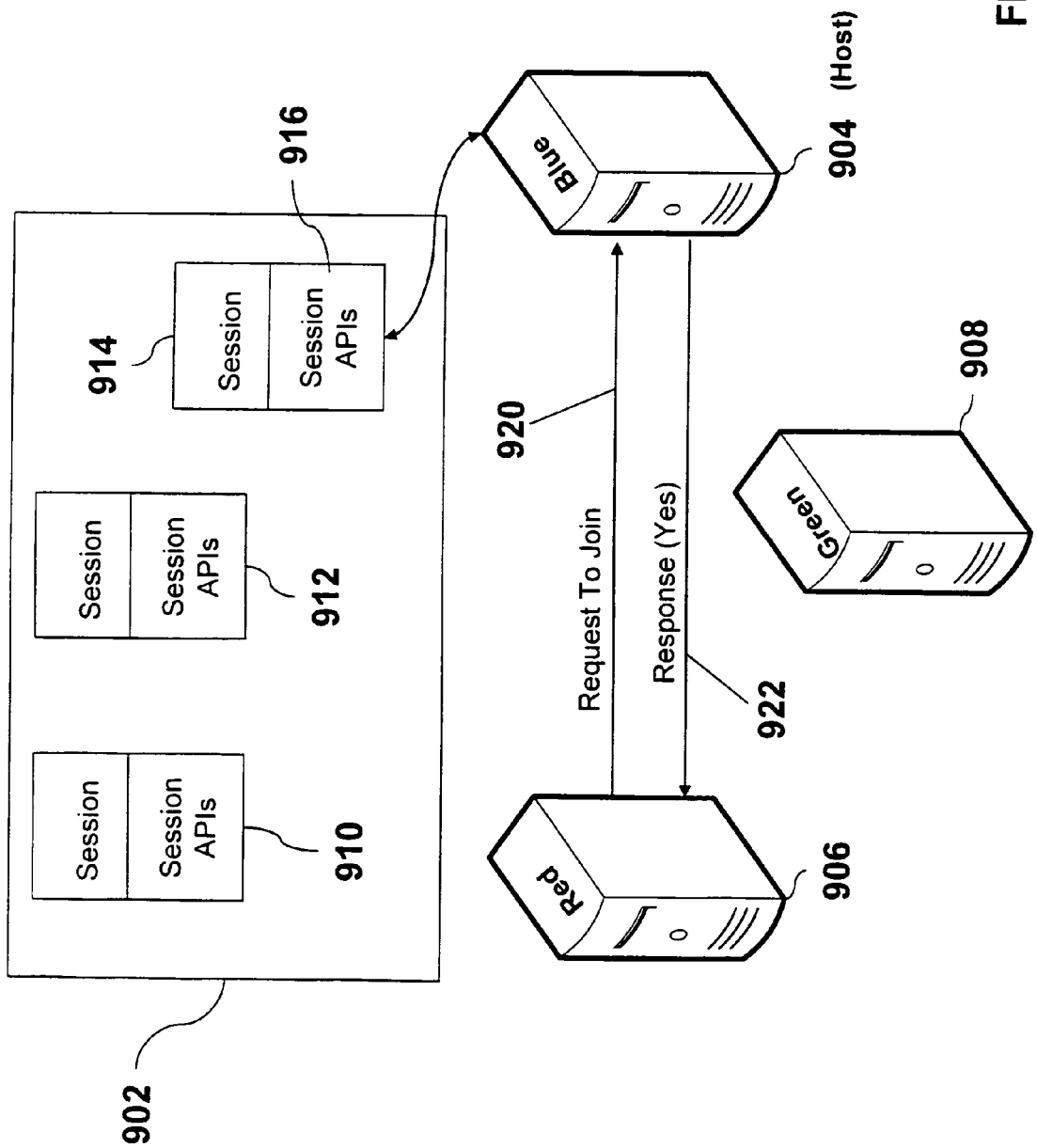

Referring to FIG. 11, player Red's game system 906 sends, via the link 918, a request to player Blue's game system 904 requesting to join the session 914 as depicted by arrow 920. A PUID associated with player Red also is sent with the request to join message. Player Blue's game system 904 receives the request message, and utilizing player Red's PUID, player Blue's game system 904 interacts with the session APIs 916 to request that player Red be joined in the session 914. Player Blue's game system 904 receives a response from the session APIs 916 accepting the request to join player Red in the session 914. Player Blue's game system 904 sends, via the link 918, a response telling player Red he has been joined in the session 914, as indicated by arrow 922. Player Blue's game system 904 sends, along with the affirmative response to player Red's game system 906, a complete list of players in the game, and any additional data necessary to set up the game code prior to playing. At this point in the exemplary scenario, player Blue is waiting for enough players to start the game, and player Green is still inactive. Next, player Red's game system 906 interacts with the session APIs 916, utilizing player Blue's PUID to join the session 914. This results in both player Red's game system 906 and player Blue's game system 904 having synchronized versions of the game to be played in session 914. Player Red now waits for player Blue to signal the beginning of the game and player Green is still inactive.

Figure 12:
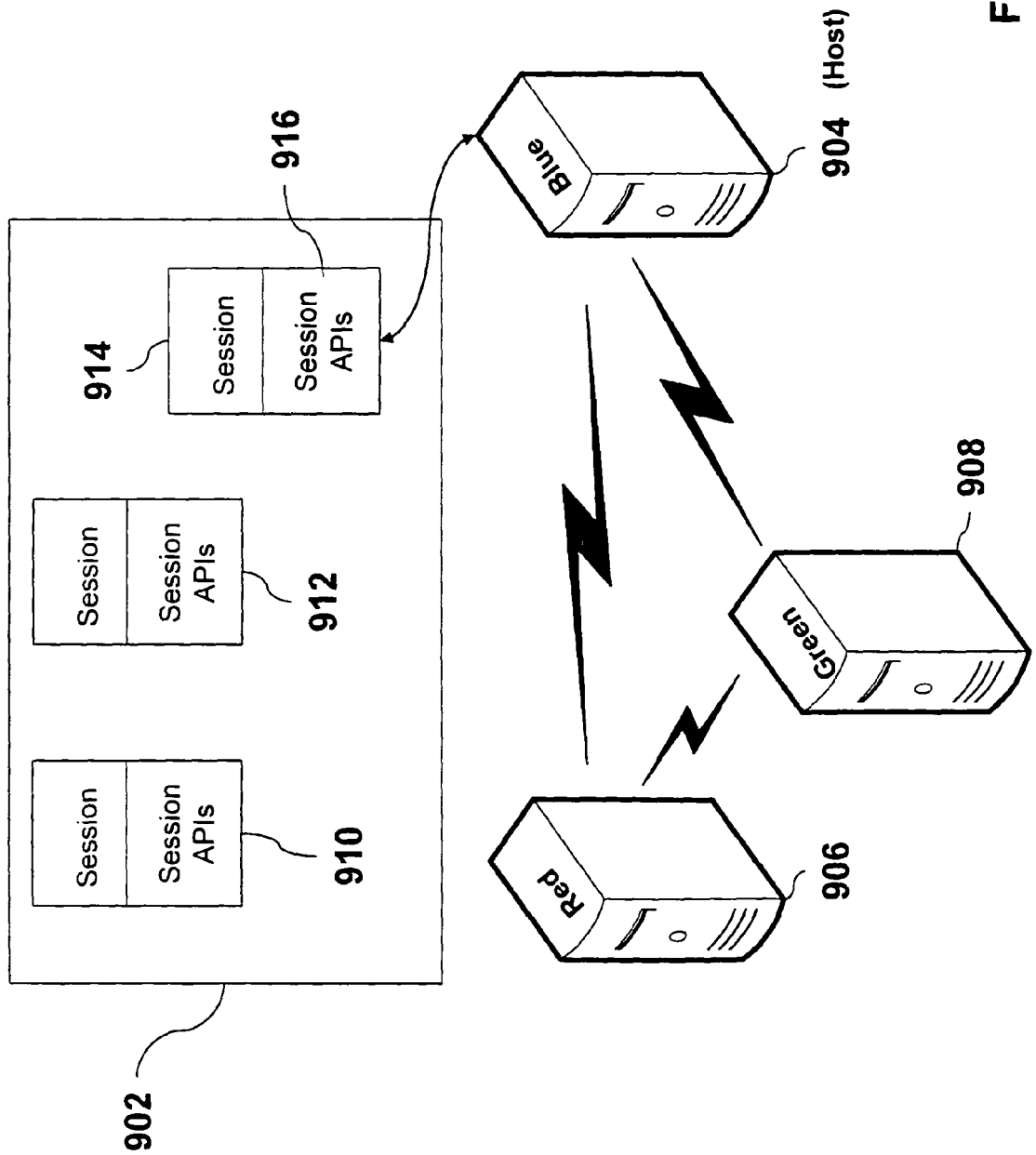

Referring to FIG. 12, at this point in the exemplary scenario, player Blue decides to invite his friend player Green into the game by sending him an invitation over a network communications channel. Player Green notices the invite and accepts it. Player Green's game system 908 receives a notification and retrieves a session information cookie from its internal storage, such as a mass memory unit or a hard disk drive memory, for example. Player Green's game system 908 interacts with session APIs 916 to build a local copy of the session 914 and to add player Green to the session 914. Player Green's game system 908 then sends a request to player Blue's game system 904 to join player Green to the session 914. Player Red is waiting for the game to start.

Player Blue's game system 904 receives the message from player Green's game system 908 asking to join the session 914. Player Blue's game system 904 again interacts with session APIs 916 to join the remote player (i.e., player Green). Upon the session APIs 916 telling player Blue's game system 904 that player Green can be joined, player Blue's game system 904 returns the affirmative response and a list of all players in the session to player Green's game system 908 (along with any data needed to set up game code prior to gameplay). Additionally, player Blue's game system 904 sends a message to player Red's game system 906 alerting player Red's game system 906 to add the new player (i.e., player Green) to the session (along with any other needed game data). Player Red's game system 906 and player Green's game system 908 receives players Blue's messages. Player Red's game system interacts with session APIs 916, utilizing player Green's PUID, to synchronize with player Blue's game system 904. Player Green's game system 908 interacts with session APIs 916 to synchronize with player Blue's game system 904.

This process continues until enough players are joined in the session 914. When enough players have joined the session 914, player Blue's game system 904 then initiates gameplay. All joined game systems interact with session APIs 916 to start the session 914. During gameplay, depending on session flags and state, additional players can join the session, and current players can leave the session. The interaction with the session APIs to leave a session is handled similarly to joining a session. The host game system is responsible for notifying all other game systems to remove players from the session (and from the game code).

Once an end condition is reached for the game, the host game system notifies the other game systems to interact (by sending the appropriate calls) with the session APIs to end the session. Game systems needing to write statistics write them prior to ending the session. Once a call to end a session has been received for all game systems, the respective players are considered in the post-game state. Post game players can either end a session (the session is deleted), or game play can be rolled over and continue by starting the session again.

As illustrated by the above exemplary scenario, session APIs manage pre-game functions, in-game functions, post-game functions, arbitration functions, and parties (groups of players). Although all APIs are not called in all scenarios, session APIs include, but are not limited to, an API for creating a session (XSessionCreate), an API for joining a session (XSessionJoinLocal and XSessionJoinRemote), an API for leaving a session (XSessionLeaveLocal and XSessionLeaveRemote), an API for arbitration (XSessionArbitrationRegister), and API for starting a session (XSessionStart), an API for flushing statistics (XSessionFlushStats), an API for ending a session (XSessionEnd), and an API for deleting a session (XSessionDelete).

Sessions track gameplay states through specific session API calls. API calls are made on all copies of the session (copied to individual game systems) in order to keep backend player information up to date. Sessions track pre-game states, in-game states, and post-game states. The pre-game state starts when a session is created and ends when a session is started. During the pre-game state, players are joining, leaving and/or changing settings. APIs called during the pre-game state include: XSessionJoinLocal, XSessionJoinRemote, XSessionLeaveLocal, XSessionLeaveRemote, XSessionModify, XSessionArbitrationRegister (for arbitrated sessions), XUserSetContext, and XUserSetProperty.

The in-game state starts when gameplay is started and ends when gameplay is ended. Players are playing the game during the in-game state. APIs called during the in-game state include: XSessionJoinLocal, XSessionJoinRemote (for join-in-progress enabled sessions), XSessionLeaveLocal, XSessionLeaveRemote, XSessionWriteStats, XSessionFlushStats (for longer sessions that risk losing accumulated statistics, such as a single-player with stats session), XUserSetContext, and XUserSetProperty.

The post-game state starts when gameplay is ended and ends when a session is deleted. During the post game state, players are in a post game lobby or the session is being cleaned up. In an exemplary embodiment, no APIs are called during the post-game state, because the session has ended and no further API calls are necessary. A session can be 'rolled over' by not deleting the session after the session ends. In this case, there is a seamless transition between the post-game and pre-game states. After XSessionEnd has completed, the title can join or leave players, and/or modify settings until starting the session again.

Sessions also manage additional functions. Arbitration of statistics is managed by sessions, including automatic session time extension. Sessions automatically extend session time as needed to finish a game. Thus, game application developers are freed from determining minimum session durations. Family settings checks are built into the session APIs. Thus game application developers are not required to make separate privilege checks. Sessions automatically provide updates to matchmaking service. As a host of a session makes session API calls, the matchmaking service is notified with relevant updates. Examples when the matchmaking service would be automatically updated include scenarios in which players are added or removed from the session (slot updates); when a match-schema-relevant context or property is changed; and when changes of game state update a match aspect (e.g., changing joinability of the session after XSessionStart for non-join-in-progress sessions). Sessions provide consistent joining of players/groups whether being joined from a game invite or from the gaming service's presence feature. Once an invite notification is received, the same path is followed to get the player/group into the game regardless of whether it is an invite join or a presence join. Sessions are enabled for all gameplay scenarios, such as online multi-player, online-enabled single-player, offline single player, and system-link, for example. Thus, game application code development is simplified.

Figure 13:
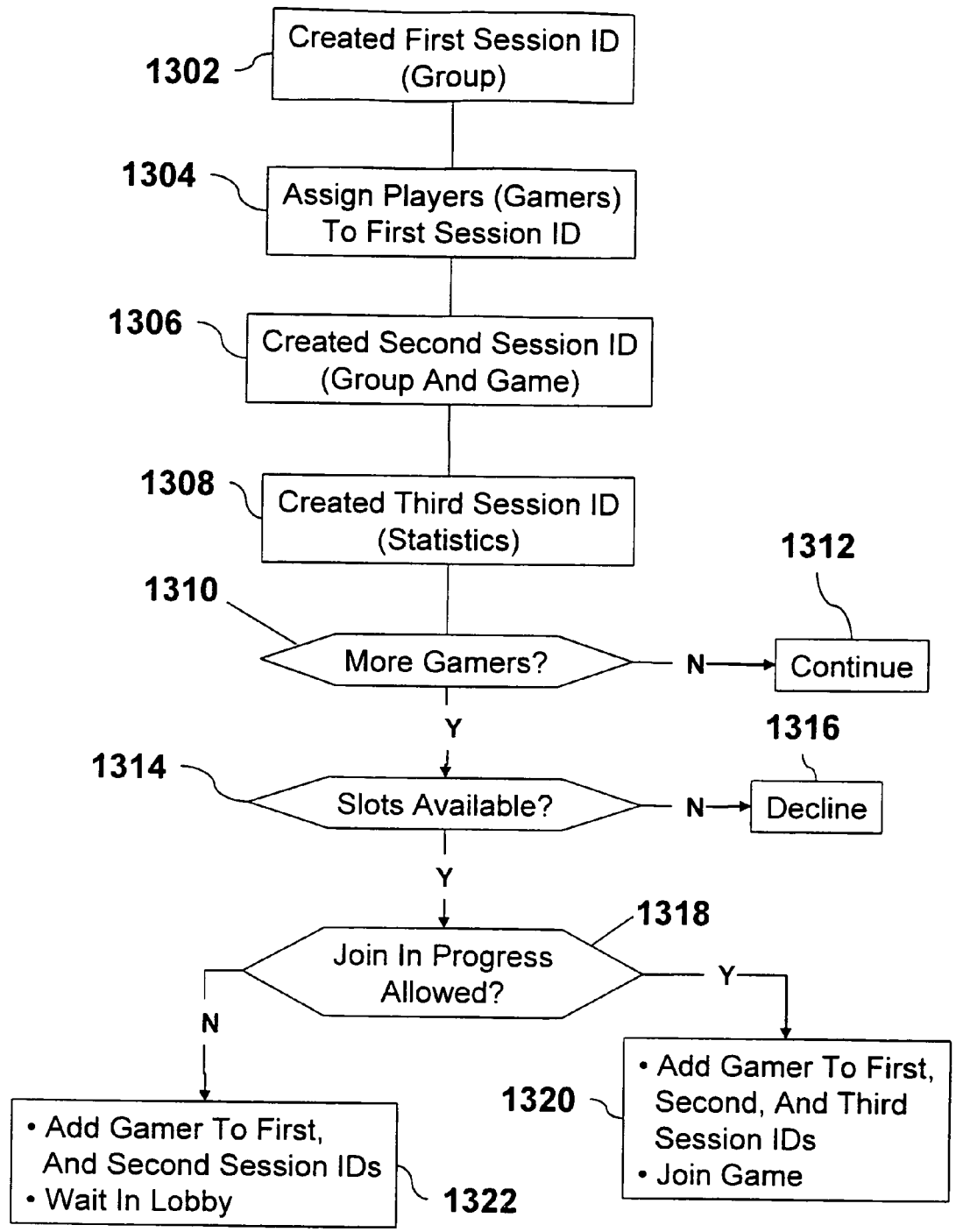
FIG. 13 is a flow diagram of an exemplary process for managing an on-line game session.

Players can be grouped together in or across game sessions. Game applications developers have the flexibility to implement party or group scenarios as desired. Session APIs support party creation and facilitate "play again" scenarios by creating 2 flavors of session ID for each gathering of players for game play. Referring to Table A below and FIG. 13, the first session ID is created at step 1302. The first session ID is indicative of the group of players (gamers). The first session ID (A, in the Table A below) is a kind of "meta-session" (the Party) associated with the host of the game (and in a hostless game or in a case of host-migration, the ID A is associated with the person who is the under-the-covers host—identified as host in the game code but not explicitly identified as a host to the players). As gamers join the party in the pre-game lobby (or as they accept invites and gather with the host) in the out-of-game console system, they join this party ID (A) at step 1304.

When the party is passed to the game, the session starts (XSessionCreate), and a new, second session ID (B) is created and assigned to the group at step 1306 by the game and is used until the session tracked just within the game is deleted (XSessionDelete). The party ID (A) persists with the host and all of the gamers who have joined the party.

When game play starts, a third session ID for tracking statistics is created at step 1308. The game play session is tracked with the third ID, C, created when XSessionStart is called. The third session ID is used to track all statistics associated with each player who actually plays in the round.

If no new players try to join the game (step 1310), the game continues at step 1312. If more players try to join the game (step 1310) and no slots are available (step 1314), the request to join the game is denied at step 1316. If slots are available (step 1314), it is determined if players can join the game in progress at step 1318. If join in progress is allowed (step 1318), the player(s) is added to the first, second, and third session IDs, and joined in the game at step 1320. In a game that has open slots (step 1314) but where join in progress is not allowed (step 1318), as depicted at step 1322, once game play begins, new gamers can continue to join this party ID A (and B, if the game allows) and can wait in the out-of-game match lobby UI in the console even while the session ID C remains closed (because the game is in progress). These new gamers who joined A can further wait in a game lobby (associated with B) for the other gamers to finish.

All data about the actual game play is associated with the ID C. In a join-in-progress game, a new gamer would need to join both the second ID (B) and the third ID (C) at the same time, then, to participate in the game play. If the host permits, the person could also be joined to the party ID (A).

When the round of game play ends (XSessionEnd), the gamers can choose to play again (in unranked game only). If they do, the party ID remains (and allows them to play again, keeping them together) as well as the overall game session ID (B), but the game play session ID (C) is abandoned as soon as XSessionEnd is called. When a new round of play starts (XSessionStart) a new game play session ID (D) is generated for tracking statistics.

The game retains the party ID and the information that this was an out-of-game match created game. At the end of each session of game play (Ranked games only allow one round of gameplay so this is not relevant, but the game can offer a "Convert to Standard" game that allows one gamer to designate himself as host and automatically send invites to the other gamers to join him in an out-of-game match lobby), the game offers the host to return the party to the out-of-game lobby or to play again. If he selects to return to the out-of-game lobby, the game sends the console a GameCompleted message and ends the game play session with the XSessionDelete API.

The party ID A is deleted when the host disbands the group of players from the out-of-game match lobby or, in cases with host migration, when no new host takes over the game. The flow looks like this:

TABLE A

| Host API call/activity | Player2 API call/activity | Player3 API call/activity | Tracking ID for group |
|---|---|---|---|
| XSessionCreateParty | | | A is created in console code. |
| Out of Game Lobby | | | A |
| | Query XSessionJoinParty | | A |
| | Out of Game Lobby | | A |
| | | Query XSessionJoinParty | A |
| | | Out of Game Lobby | A |
| StartSession message passed from console app to game. Host selects a game from out-of-game match UI, inserts game disk, and inputs the game settings. | Player prompted to insert game disk. | Player prompted to insert game disk. | Console passes StartGame message—with all game settings and list of players - to game code |
| XSessionCreatet | XSessionCreatet | XSessionCreatet | B is created by game to track the gathering of players in the game (A persists in the background) |
| In-Game Lobby | In-Game Lobby | In-Game Lobby | B |
| XSessionStart | XSessionStart | XSessionStart | C (game-play session ID) is created by game while A and B persist in the background. |
| Game play | Game play | Game play | Stats are tracked for all of the players associated with C. |
| XSessionEnd | XSessionEnd | XSessionEnd | C is closed (A, B persist in the background) |
| In-Game Lobby | In-Game Lobby | XSessionDelete Player chooses to quit game at this point and return to out-of-game lobby to wait for Player1 and Player2. GameCompleted message sent. | All players associated with B remain together to play next session. A persists in the background so that player who quits game and calls GameCompleted can wait in out-of-game lobby. |
| XSessionStart | XSessionStart | Out-of-game lobby. | D is created (A, B persist in the background) |
| Game play | Game play | Out-of-game lobby. | D (A, B persist in the background) |
| XSessionEnd | XSessionEnd | Out-of-game lobby. | D is closed (A, B persists in the background) |
| In-Game Lobby | In-Game Lobby | Out-of-game lobby. | Player1 and Player2 remain associated by A, B. Player3 is still waiting in out-of-game lobby, associated with A only. |
| XSessionDelete | XSessionDelete | Out-of-game lobby. | B is closed in game. |
| GameCompleted message | GameCompleted message | Out-of-game lobby. | Game passes GameCompleted message back to console. |

TABLE A-continued

| Host API call/activity | Player2 API call/activity | Player3 API call/activity | Tracking ID for group |
|---|---|---|---|
| Out-of-game lobby. | Out-of-game lobby. | Out-of-game lobby. | All players gather together again in out-of-game lobby. |
| Host decides to dissolve party. | | | |
| XSessionDeleteParty | XSessionDeleteParty | XSessionDeleteParty | A is closed and all players go their separate ways. |

Once the configuration process is complete and the game has instrumented its code so that it can accept the StartGame message from the service, manage the grouping of players with the session and party API, and pass back the GameCompleted message to the service when the group wishes to leave the game, the service can render the out-of-game matchmaking User Interface (UI) in the console system application. The UI includes three main parts: find a session, create a session (to allow others to search and join), and browse/find people to assemble a party. That UI is better understood with reference to FIG. 14. Initially at step 1102, the player has completed the matchmaking process with other players that match the criteria of friends and/or Affiliates. The system then indicates the number of players that meet the matchmaking criteria selected by a player. The UI presents a player with three selections: selection A essentially provides the game player with the ability to find a game that has been started by another player and to join that session. In that case, the UI presents to the player a list of games and allows the player to select a game screen at step 1104. The screen displays a number of games (e.g., Halo, PGR, etc.) along with the number of gamers and the number of Affiliates/friends in each game. This additional information about where the player's Affiliates (friends, Recent Players, and positive feedback people) are currently playing helps in making the game selection. After selecting a particular game, a Select a Session Screen 1106 lists the total number of sessions at the top of the screen (each filter reduces the number of sessions) and allows the gamer to proceed with one of three options:

The first option is Select a Session (each session listed by Session Descriptor that includes key attributes about the people and settings of the session). The session selection puts the player into the out of game lobby 1114. There, the player will wait until a start game message is sent to the player's console 100 to start the game session. If the player chooses this option, he will usually be dropped into a hostless game (i.e. a game where no one player controls the settings). The game settings may be chosen at random. "Hostless" games cannot return together to the out-of-game Lobby. When the game ends, the players can choose to continue in the same game with the same settings, the game can choose to randomly rotate the game settings, or the players can leave.

Figure 14:
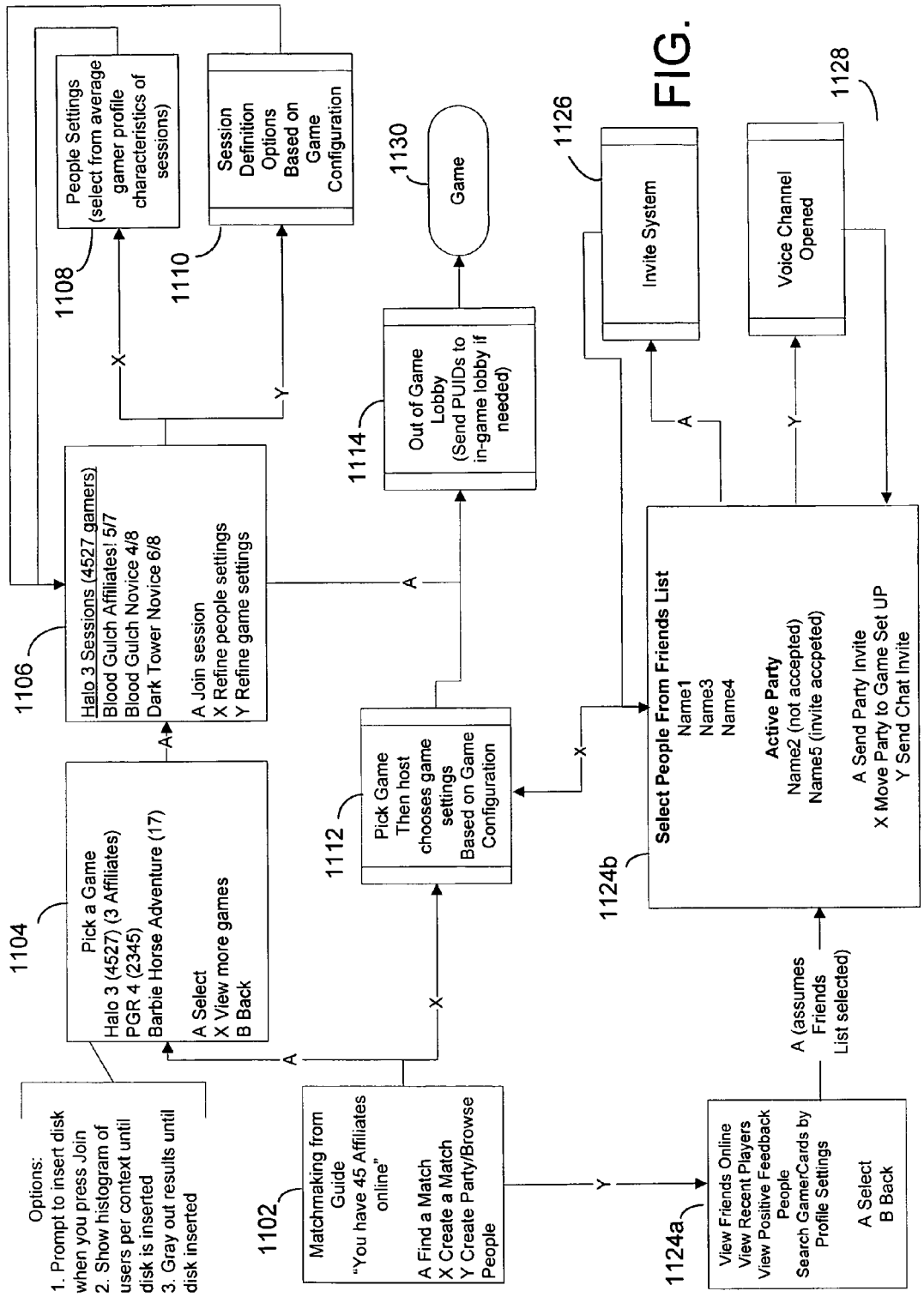
FIG. 14 is a flow chart illustrating an exemplary user interface flow in setting up a matchmaking session.

The second option is to Filter on People Settings (including reputation, skill, type of gamer, e.g., casual, hardcore, etc.). FIG. 14 depicts this activity in box 1108. This step leverages the User Profile but allows the player to choose which aspects of his profile to emphasize in filtering the long list of sessions available.

Filter on Game Settings offers a subset of Session Definition options described in the configuration process, above. For example, a player may desire to filer on a particular game level so that only sessions at that level will appear in the screen selections. The Filter on Game Settings is depicted by box 1110. Among game settings is the ability to choose "Hostless" v. "Hosted (Party)" games.

Figure 15:
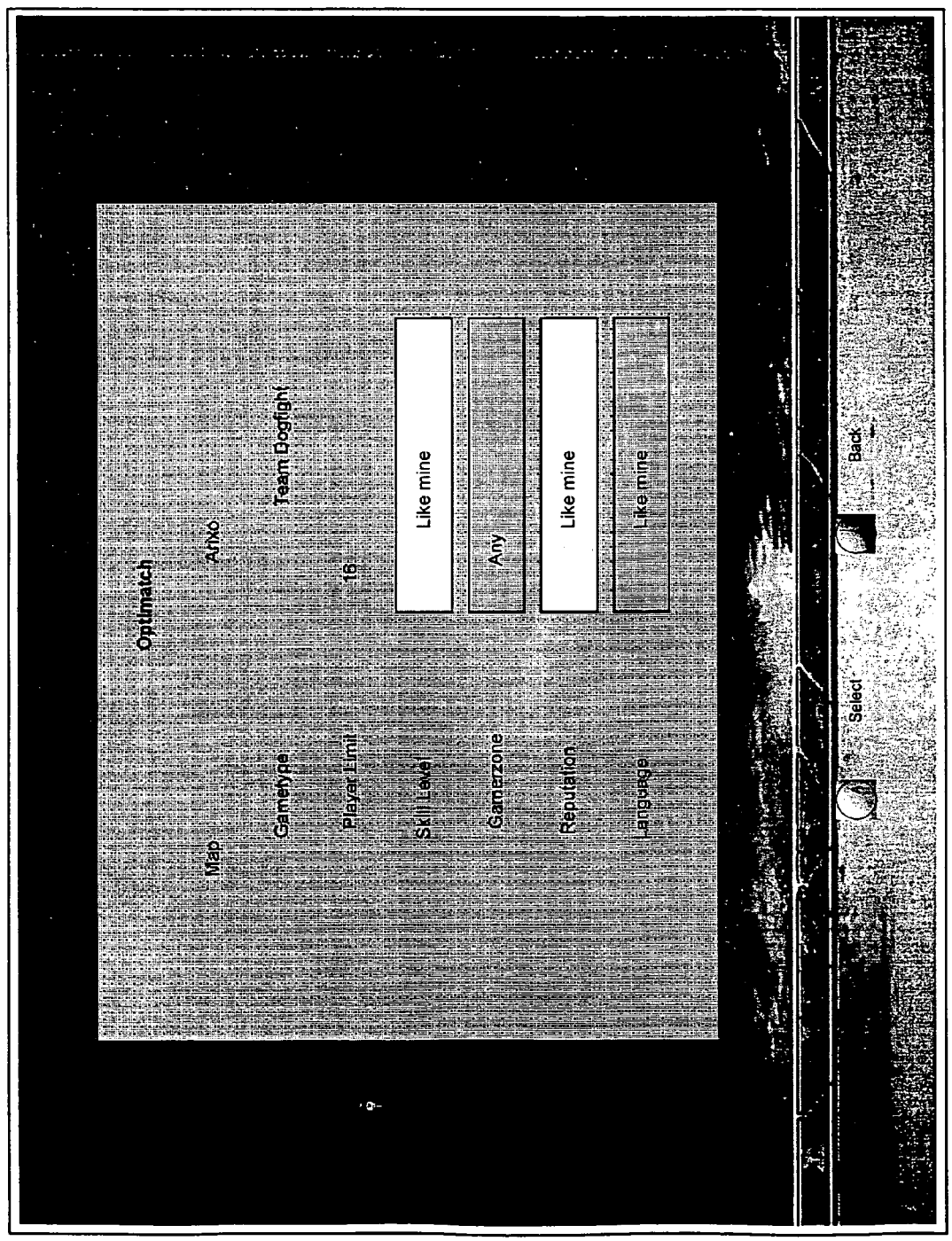
FIG. 15 illustrates a user interface whereby players can filter choices for a matchmaking session and then choose among a list of sessions according to their descriptors.

FIG. 15 depicts a UI for a particular game where both the Game Settings and People Settings may be filtered in one simple screen.

Figure 16:
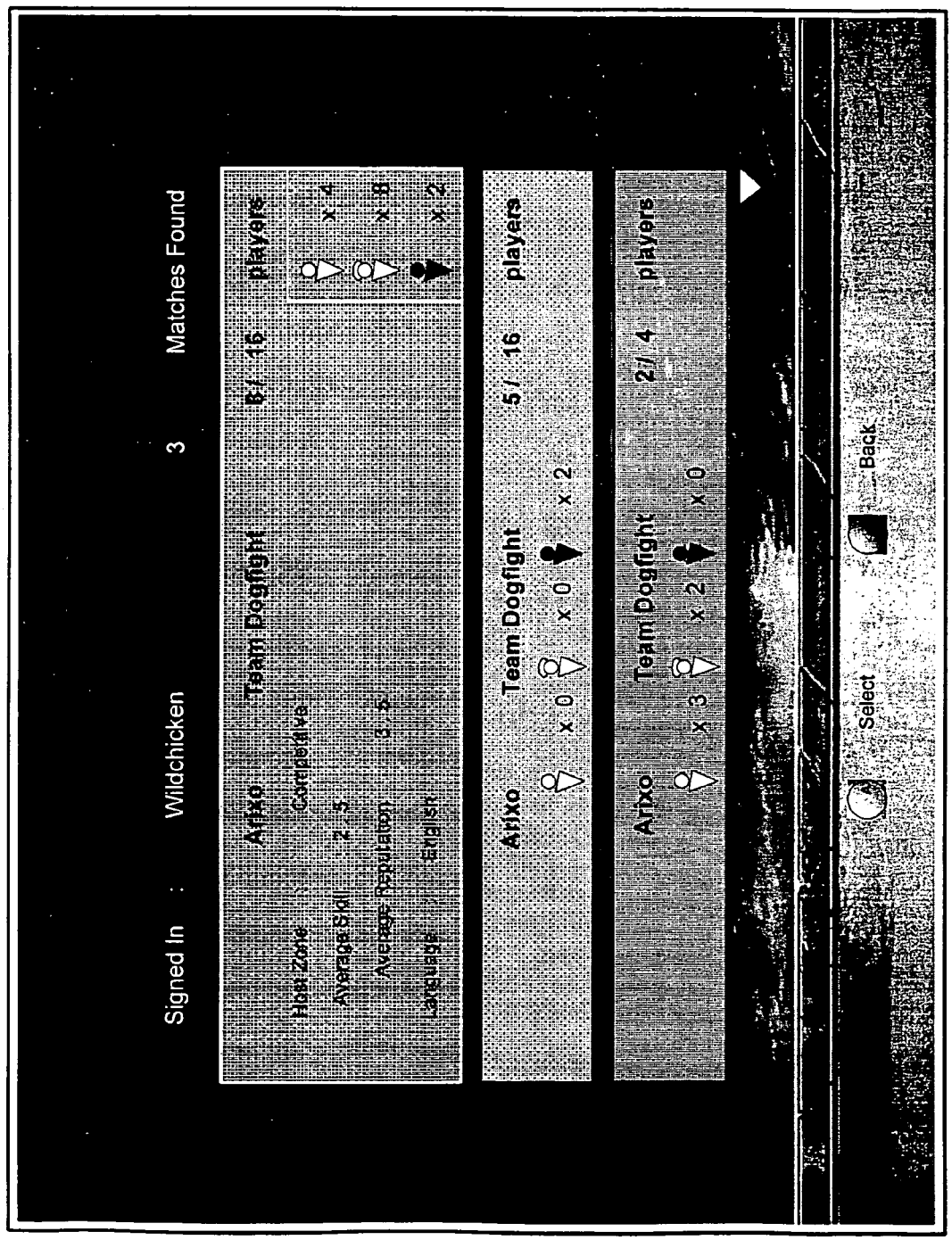
FIG. 16 also illustrates a user interface whereby players can filter choices for a matchmaking session and then choose among a list of sessions according to their descriptors.

When choosing among sessions, the player can view a session descriptor for each session. The system app UI shows a per-game-mode session descriptor that contains a summary of key User Profile averages for the session, a summary of the major game settings, and a "Session Label" that identifies the type of game play in the session (defined by the "Zone" of the players in the game). This data helps a player get an "at-a-glance" view of each session so that he can pick the best one to join. The data in the session descriptor includes:
  Game name
  Host's name
  Community reputation rating of the players in the game
  Atmosphere or rules of the game (e.g., use of mature language, level of competitiveness)
  Game settings (e.g., type of game, level or track being played)
  Connection speed (i.e., ping)
  Skill level of the players in the game
  Whether there are friends of yours in the game
  Whether there are friends of your friends in the game
  Whether there are people you have enjoyed playing with previously in the game
  Language spoken in the game
  The country game is being hosted in FIG. 16 depicts a UI where a player is selecting a particular session (the yellow boxed selection) among a list of sessions and is viewing some of the session descriptor details.

If the player would rather create a game session than join an existing session, the player can select "Create a Match" and move to step 1112. In that case, the player proceeds to a screen that allows the player pick a game title for which he would like to create a session. At that point, the player can define the game based on the game configuration options. For example, the player can select the level of play, the number of players, and so on. After the player defines the game session (defined by the game in the configuration process), the player enters a game lobby until participants join. That game session will then show up on other gamers screens that were searching for a game to join (i.e., as illustrated in steps 1104 and 1106). Games set up in this way are "hosted" games (hosted by the player who created the session) that result in a game "Party," and when they are completed, all of the players have the option of either continuing in the same game, letting the host change the game settings for that game, or returning to the out-of-game lobby.

Private Parties are managed in by identifying the assembly of players in the party separately from the gathering of players for a particular session of game play.

In addition to waiting for gamers to join the game session, the player can actively seek participants and build a Party by choosing "Create a Party." As shown in step 1124, the player can browse the Gamercards on friends list, Recent Players list and or otherwise find gamers with User Profiles that meet certain search criteria, e.g., having a certain skill level, locale, and/or reputation, or who are otherwise friends or Affiliates. After finding the various matching gamers, the player can invite them to join a Party session directly by sending that gamer an invite to the Party session. If the player accepts the invite he is joined in the OOG (Out-Of-Game) match Party lobby. Alternatively, a voice channel can be opened whereby the gamers can communicate, e.g., about the game session. Finally, while browsing for gamers, selected gamers can be added to the player's Affiliates list so that they will be noted as Affiliates in future game selections.

The Party Lobby (1112), when accessed from the "Create a Party Flow" allows the designated host to choose among all games available on his played games list and all the played games list of players currently in the Party Lobby. It will call out those games on the host's list that are not available to one or more players in the lobby. If the host chooses to play one of the games unavailable to one or more players, those players can wait in the lobby for the party to return or can leave. The host will not be able to start a game that drops all the players.

When the players have completed game play in a party game, the game must give the players the option to return to the OOG match party lobby. The game must send back to the system a "Game Completed" message. The out-of-game party lobby allows the group of players to remain together and communicate with each other with the host player designated to choose which game to play next and, once the game is chosen, which settings for the game to choose (map etc.)

Because of the limitations of the game (as specified in the Session Description), some game types may not be available to the party (e.g. if there are 6 people in the party, some game types may not be selectable because only 4 players are allowed).

Although sessions manage much of the game experience, in an exemplary embodiment, the host game system is responsible for managing communications between game systems to keep sessions in sync, manage gameplay states, and play the game. Each game system maintains a local copy of a session, and sessions do no behind-the-scenes communication with each other. Thus, titles are responsible for ensuring that the local copies of the session remain in sync with the host game system's copy of the session. When new players ask to join a session, if successful, the host communicates the addition of the new player(s) to all connected game systems. The host game system also is responsible for communicating the departure of a player while a session is active.

For arbitrated sessions, the host game system also is responsible for managing re session registration. The host of the session, when ready to start, indicates to all connected game systems that they should call XSessionArbitrationRegister. After all other game systems have registered, the host game system registers. Alternately, the host game system can register early (before the other game systems are finished registering), and then register again after all game systems have completed. A list of all currently registered players is returned from a successful registration call. After receiving this list, it is the host game system's responsibility to process the list and notify all clients of any players who did not successfully register. These players are removed from the session and can not participate in the gameplay.

Sessions APIs create and delete sessions. Sessions are created with the XSessionCreate API. Various options and flags are specified to create a session. One option to specify is the game type such as "Capture the Flag," King of the Hill," or "Deathmatch." That is, the Game_Type is set prior to creating a session. In an exemplary embodiment, if game type is not set, a default game type of ranked session is set. Once XSessionCreate has completed, game type is locked for that session and the game type context can be altered as necessary to create other sessions. In addition to game type, session flags appropriate to the needs of the session are specified at creation time. These flags initiate the setting up of feature integration for the session. Some of the flags can be toggled after a session is created. Exemplary flags and respective effects are listed in the table below.

| Flag Name | Effect |
| --- | --- |
| XSESSION_CREATE_HOST | Sets the local session copy as the host of the session. In an exemplary embodiment, there is one host per session. |
| XSESSION_CREATE_USES_PRESENCE | Advertises the session in the presence service. When players join via a player's Gamercard options menu, this is the session they will join. In an exemplary embodiment, a player can join only one presence session. |
| XSESSION_CREATE_USES_STATS | Sets up the session to track player statistics. If this flag is not passed, no statistics are collected for the session. |
| XSESSION_CREATE_USES_MATCHMAKING | Advertises the session in the matchmaking service, making it searchable. This flag is passed in order to have a session joinable through matchmaking. |
| XSESSION_CREATE_USES_ARBITRATION | Sets up the session to use the arbitration service. This flag is passed for all ranked sessions. |
| XSESSION_CREATE_USES_PEER_NETWORK | Sets up XNET key registration for the session. Also signals enforcement of multi-player and parental controls privilege settings. |

| Flag Name | Effect |
| --- | --- |
| XSESSION_CREATE_INVITES_DISABLED | Disables the ability of players to send invites from the Guide. Does not prevent invites sent with the XInviteSend API. |
| XSESSION_CREATE_JOIN_VIA_PRESENCE_DISABLED | Disables the ability of players to join the session from a player's Gamercard. |
| XSESSION_CREATE_JOIN_IN_PROGRESS_DISABLED | Disables the ability of players to join the session (either from matchmaking or from presence) after XSessionStart has been called. |

The XSessionDelete API is called is called to delete a session. When XSessionDelete is called, the session is cleaned up. Any players in the session are removed and XNET registration keys are unregistered. All memory used for the session is freed as well.

Session APIs also manage functions associated with joining and leaving sessions. Users (local or remote) can be joined to a session. XSessionJoinLocal and XSessionJoinRemote are called, respectively, to join users locally and remotely. XSessionJoinLocal and XSessionJoinRemote perform the same function in that they each add users to a session. XSessionJoinLocal and XSessionJoinRemote expect to use different user IDs, however, XSessionJoinRemote can be used for local users as well as remote users as long as the remote user ID is utilized. Thus, titles can elect to use XSessionJoinRemote for all users.

Similarly, XSessionLeaveLocal and XSessionLeaveRemote are called, respectively, to remove local and remote users. XSessionLeaveLocal and XSessionLeaveRemote perform the same function in that they each remove users from a session. XSessionLeaveLocal and XSessionLeaveRemote expect to use different user IDs, however, XSessionLeaveRemote can be used for local users as well as remote users as long as the remote user ID is utilized. In fact, titles can elect to use XSessionLeaveRemote for all users.

Statistics are reported prior to calling XSessionLeave. Statistics are not reported for players who have left the session. Ultimately, the game decides what statistics to write for the match. In an exemplary embodiment, two statistics are always reported: the session team and relative score. The session team is the team the player was with during the session (a unique value in a non-team game). Statistics cannot be recorded on the service for a player after XSessionLeave has been called for that player. Titles can either write these statistics and call XSessionLeave as the player exits, or the title can log the information and take care of statistics writes and leaves at the end of the game (prior to calling XSessionEnd).

When a player quits or disconnects before he/she has completed game play, the player's skill data is written prior to calling XSessionLeave for him/her. The session team is written for the team the player was on when he or she left the session. In an exemplary embodiment, when a player does not finish the game, a relative score of last place (regardless of the player's actual score) is assigned to that player. This helps to prevent a player from quitting a game when his/her score is high simply to improve his/her statistics.

While illustrative embodiments have has been described in connection with various Figures, it is to be understood that other similar embodiments can be used or modifications and additions can be made to the described embodiment for performing the same function of on-line gaming session and party management without deviating therefrom.

What is claimed:

1. A method for managing a computer-based game session, said method comprising:

receiving, by a game hosting service, a request to start a party session from a remote computer, the request associated with a user profile, wherein the party session exists outside of a game and across different games;

selecting, by the game hosting service by using positive feedback information associated with available players stored in the user profile, one or more of the available players for the party session to form a first group of players, the positive feedback information set by a user associated with the user profile, wherein an available player who has accepted an invitation from the user to a social network comprises a friend gamer, and an available player who has been given positive feedback by the user comprises a positive feedback person, the game hosting service prioritizing for selection the friend gamer over the available players who are not friend gamers, and prioritizing for selection the available players who are not friend gamers and have higher positive feedback set by the user than other available players who are not friend gamers;

establishing, by the game hosting service, a party session identifier indicative of the first group of players;

establishing, by said game hosting service, a game session identifier upon start of a first game session by said first group of players;

establishing a first game-play session identifier for tracking statistics of each of said first group of players during said first game session;

retaining said party session identifier and said game session identifier upon completion of said first game session;

abandoning said first game-play session identifier upon completion of said first game session;

updating said positive feedback information of the user profile upon completion of said first game session; and selecting a second group of players from the party session for a second game session by using the positive feedback information to prioritize the available players that have higher positive feedback information than other available players.

2. The method in accordance with claim 1, further comprising:

establishing a second game-play session identifier for tracking statistics of each of said second group of players; and maintaining, by said game hosting service, said party session identifier for said second group of players.

3. The method in accordance with claim 1, wherein said statistics comprise a game score for each player in said first game session and a relative game score, relative to other players in said first game session.

4. The method in accordance with claim 1, wherein said game hosting service provides automatic session time extensions on an as-needed basis to allow completion of said first or said second game session.

5. The method in accordance with claim 1, further comprising:
said game hosting service determining if a non-joined player is eligible to join said first game session or said second game session in accordance with at least one of a privilege and a restriction associated with said non-joined player.

6. The method in accordance with claim 1, further comprising updating, by said game hosting service, a skill rating of one of said first group of players using statistics identified by said game-play session identifier.

7. A method for managing a computer-based game session between a game hosting service and at least one game device, said method comprising:
providing a matchmaking system whereby a first player places a second player in an avoid list;
creating, by said game hosting service, a party session hosted by said first player, wherein the party session exists outside of a game and across different games;
matching said first player and a first group of players to said party session, said matching automatically precluding said second player;
starting, by said game hosting service, a first game session including at least some of said first group of players;
ending, by said game hosting service, said first game session;
removing, by said game hosting service, an association of said at least some of said first group of players with said first game session;
providing positive feedback for a third player of said first group of players, the positive feedback provided by the first player;
creating, by said game hosting service, a second game session; and
matching said first player with a second group of players that is a subset of the first group of players in the party session, said second group of players including said third player who is prioritized over a fourth player based on said positive feedback and automatically excluding said second player.

8. The method in accordance with claim 7, further comprising:
performing, by said game hosting service, at least one of adding a non-joined player to said first game session or said second game session and removing a current player from said first game session or said second game session.

9. The method in accordance with claim 7, further comprising:
determining, by said game hosting service, if a non-joined player is eligible to join said first game session or said second game session in accordance with at least one of a privilege and a restriction associated with said non-joined player.

10. The method in accordance with claim 7, wherein said game hosting service provides automatic session time extensions on an as-needed basis to allow completion of said first game session or said second game session.

11. The method in accordance with claim 7, further comprising:
updating, by said game hosting service, at least one of a skill rating or a social rating of one of said first group of players or said second group of players.

12. The method in accordance with claim 7, further comprising:
determining statistics associated with each player joined in said first game session or said second game session; and
placing one of said first group of players or said second group of players in an affiliates list of said matchmaking system.

13. The method in accordance with claim 12, wherein said statistics comprise a game score for each player joined in said first game session or said second game session and a relative game score, relative to other players joined in a respective game session.

14. A game hosting computing device, comprising:
a CPU;
a memory; and
an application programming interface loaded into the memory and executed on the CPU, the application programming interface comprising instructions for:
instantiating a game hosting service whereby a first player places a second player in an avoid list and provides positive feedback to a third player whereby the third player is placed in an affiliates list, wherein positive feedback and avoid lists are maintained for each player that uses the game hosting service and the game hosting service prioritizes players for selection that have higher positive feedback and avoids selecting players listed on the avoid list;
creating, by said game hosting service, a party session hosted by said first player, the party session existing outside of a game and across different games, the party session being joinable by an additional player while the party session is in progress;
matching said first player and a group of players to said party session, said matching automatically precluding said second player and automatically including said third player based on the positive feedback provided by the first player, said matching comprising prioritizing the third player over a fourth player based on higher positive feedback provided to the third player as compared to the fourth player;
starting, by said game hosting service, a game session;
ending, by said game hosting service, said game session; and
removing, by said game hosting service, an association of all players with said game session while maintaining said party session.

15. The game hosting computing device of claim 14, said application programming interface further comprising instructions for:
establishing, by said game hosting service, a party session identifier indicative of said group of players;
establishing, by said game hosting service, a game session identifier upon start of said game session by said group of players;
establishing a game-play session identifier for tracking statistics of each of said group of players during said game session;
retaining said party session identifier and said game session identifier upon completion of said game session;
abandoning said game-play session identifier upon completion of said game session; and
establishing a new game-play session identifier for tracking statistics of each of said group of players during a subsequent play-again game session.

16. The game hosting computing device of claim 15, wherein matching said first player and said group of players to said party session comprises providing a higher priority to a game player designated as a friend in said affiliates list than to the fourth player having positive feedback and not designated as a friend in said affiliates list.

17. The game hosting computing device of claim 16, wherein matching said first player and said group of players to said party session comprises providing a higher priority to said fourth player having positive feedback than a fifth player designated as a recent player in said affiliates list.

18. The game hosting computing device of claim 15, wherein said statistics comprise a game score for each player of said game session and a relative game score, relative to other players of said game session.

19. The game hosting computing device of claim 14, the application programming interface further comprising instructions for:
   determining, by said game hosting service, if a non-joined player is eligible to join said party session in accordance with at least one of a privilege and a restriction associated with said non-joined player.

20. The game hosting computing device of claim 14, the application programming interface further comprising instructions for:
   updating, by said game hosting service, at least one of a skill rating or a social rating of one of said group of players.

* * * * *